(12) United States Patent
Bernard et al.

(10) Patent No.: US 8,600,057 B2
(45) Date of Patent: Dec. 3, 2013

(54) PROTECTING OPTICAL TRANSPORTS FROM CONSECUTIVE IDENTICAL DIGITS IN OPTICAL COMPUTER NETWORKS

(75) Inventors: Christopher T. Bernard, Wayzata, MN (US); Charles J. Eddleston, Minneapolis, MN (US)

(73) Assignee: Calix, Inc., Petaluma, CA (US)

( * ) Notice: Subject to any disclaimer, the term of this patent is extended or adjusted under 35 U.S.C. 154(b) by 0 days.

(21) Appl. No.: 13/364,679

(22) Filed: Feb. 2, 2012

(65) Prior Publication Data

US 2013/0202112 A1  Aug. 8, 2013

(51) Int. Cl.
*H04L 29/06* (2006.01)
*H04B 10/08* (2011.01)

(52) U.S. Cl.
USPC .............. 380/256; 398/25; 714/811; 380/268

(58) Field of Classification Search
None
See application file for complete search history.

(56) References Cited

U.S. PATENT DOCUMENTS

| | | | |
|---|---|---|---|
| 2002/0124090 A1* | 9/2002 | Poier et al. ............. | 709/228 |
| 2006/0007953 A1 | 1/2006 | Vesma et al. | |
| 2010/0272430 A1* | 10/2010 | Weeber ................ | 398/1 |
| 2010/0322340 A1* | 12/2010 | Bohm ................... | 375/295 |

OTHER PUBLICATIONS

ITU-T, G.984.3, Series G: Transmission Systems and Media, Digital Systems and Networks, Digital sections and digital line system—Optical line systems for local and access networks, Gigabit-capable Passive Optical Networks (G-PON): Transmission convergence layer specification, Mar. 2008, 146 pages.
U.S. Appl. No. 13/364,695, filed Feb. 2, 2012, entitled "Protecting Optical Transports from Consecutive Identical Digits in Optical Computer Networks," Bernard et al.
Office action for U.S. Appl. No. 13/364,695, mailed Feb. 25, 2013, 19 pages.
Office action for U.S. Appl. No. 13/364,695, mailed Aug. 8, 2013, 16 pages.
Response to office action for U.S. Appl. No. 13/364,695, filed May 28, 2013, 18 pages.

* cited by examiner

*Primary Examiner* — Gilberto Barron, Jr.
*Assistant Examiner* — Malcolm Cribbs
(74) *Attorney, Agent, or Firm* — Shumaker & Sieffert, P.A.

(57) ABSTRACT

An example method includes encapsulating, by an optical network device, at least a portion of a data packet to form a passive optical network (PON) frame. The method further includes applying, by the optical network device, a scrambling polynomial to at least a portion of the PON frame to generate a scrambled PON frame. The method further includes determining, by the optical network device, that the scrambled PON frame comprises a consecutive identical digit (CID) sequence greater than a threshold length. The method further includes replacing, by the optical network device the determined CID sequence with a correction pattern to generate a modified scrambled PON frame. The method further includes transmitting, by the optical network device, the modified scrambled PON frame.

28 Claims, 14 Drawing Sheets

PROTECTING OPTICAL TRANSPORTS FROM CONSECUTIVE IDENTICAL DIGITS IN OPTICAL COMPUTER NETWORKS

TECHNICAL FIELD

The disclosure relates to computer networks, and more particularly, to protecting optical transports from consecutive identical digits in optical computer networks.

BACKGROUND

An optical network, such as a passive optical network (PON), often delivers voice, video and/or other data among multiple network nodes. A PON is an example of a so-called "point-to-multipoint" network. A PON may conform to any of a variety of PON standards, such as broadband PON (BPON) (ITU G.983), gigabit-capable PON (GPON) (ITU G.984), or gigabit Ethernet PON (GEPON) (IEEE 802.3). The architecture of a point-to-multipoint network commonly includes a single central device that communicates with multiple network nodes. In the example of a PON, the central device is often referred to as an optical line terminal (OLT), and the network nodes are often referred to as optical network units (ONUs) or optical network terminals (ONTs). The OLT delivers data to multiple ONUs using a common optical fiber link. Passive optical splitters and combiners enable multiple ONUs to share the common optical fiber link. The optical line terminal (OLT) transmits information downstream to the ONUs, and receives information transmitted upstream from the ONUs. Each ONU terminates the optical fiber link for a residential or business subscriber, and is sometimes referred to as a subscriber or customer premises node.

In most PONs, the OLT and ONUs are synchronized in terms of timing to enable the transfer of data both downstream from the OLT to the ONUs and upstream from the ONUs to the OLT. The bandwidth of the common fiber optical link is typically partitioned into time slots, where some of the time slots are reserved for downstream data transfers while other time slots are assigned to individual ONUs for upstream data transfers. If timing is not preserved and synchronized between the ONU and the OLT, two or more of the optical network devices (e.g., OLT and/or ONTs) may attempt to transmit data at the same time, causing interference and potentially loss of data.

To preserve this synchronization between these devices, the OLT commonly transmits optical signals during times of data transfer inactivity that enable the ONUs to maintain synchronous timing with the OLT. Commonly, these optical signals that enable time synchronization (which may be referred to as "timing optical signals") comprise a one bit followed a zero bit, where the OLT transmits the timing optical signals at a known frequency. The ONU may then derive the timing from the bit transitions of the optical timing signals during times of data transfer inactivity and thereby preserve synchronous timing with the OLT.

During times of data transfer activity, the OLT may generally transmit data downstream to ONUs or receive data upstream from ONUs that includes sufficient bit transitions that the OLTs and ONUs may maintain synchronous timing. Yet, in some instances, where the data may comprise long runs of ones or zeros, timing may be lost as there are insufficient bit transitions from which the OLTs and ONUs may derive the timing. To guard against data having long runs of ones or zeros, the OLTs and ONUs may employ a common scrambler function to scramble data in a manner that greatly reduces the occurrence of long runs of ones or zeros prior to sending this data either upstream or downstream.

SUMMARY

In general, techniques are described in the present disclosure that may prevent malicious attacks that attempt to utilize security vulnerabilities of the PON scrambling functions as the source of PON attacks. While the PON scrambling functions may generally prevent non-malicious data from affecting time synchronization between the OLT and one or more of the ONUs, these PON scrambling functions may not be robust in preventing malicious attacks that leverage these security vulnerabilities to disrupt timing synchronization between the OLT and one or more of the ONUs. The techniques may provide an additional level of protection from long runs of either ones or zeros (which may generally be referred to as "consecutive identical digits" or "CIDs" by checking or otherwise inspecting the output of scrambled PON data. Thus, should a malicious program or user target the PON in an attempt to leverage the well-known scrambling functions such that it outputs CID that cause the PON to lose synchronous timing, the techniques may detect this CID and enable either the ONU or the OLT to take measures to replace this CID to potentially prevent the loss of timing synchronization.

In one aspect, a method comprises encapsulating, by an optical network device, at least a portion of a data packet to form a passive optical network (PON) frame, applying a scrambling polynomial to at least a portion of the PON frame to generate a scrambled PON frame, determining that the scrambled PON frame comprises a consecutive identical digit (CID) sequence greater than a threshold length, replacing the determined CID sequence with a correction pattern to generate a modified scrambled PON frame, and transmitting the modified scrambled PON frame.

In another aspect, a method comprises receiving, by an optical network device, a modified scrambled passive optical network (PON) frame, determining that a payload of the modified scrambled PON frame includes a correction pattern, and replacing the determined correction pattern with a consecutive identical digit (CID) sequence to form a scrambled payload. The method further comprises applying, by the optical network device, an inverse scrambling polynomial to the scrambled payload to form a descrambled payload, and transmitting a data packet that includes the descrambled payload.

In another aspect, an optical network device comprises a passive optical network (PON) interface that receives a modified scrambled PON frame and a PON media access controller (MAC) that determines that a payload of the modified scrambled PON frame includes a correction pattern and replaces the determined correction pattern with a consecutive identical digit (CID) sequence to form a scrambled payload. The optical network device further comprises a descrambler of the PON MAC that applies an inverse scrambling function to the scrambled payload to form a descrambled payload, and a network interface that transmits a data packet that includes the descrambled payload.

In another aspect, an optical network device comprises a framer that encapsulates at least a portion of a data packet to form a passive optical network (PON) frame, a scrambler that applies a scrambling polynomial to at least a portion of the PON frame to generate a scrambled PON frame, a consecutive identical digit (CID) checker that determines that the scrambled PON frame comprises a consecutive identical digit (CID) sequence greater than a threshold length, and replaces the determined CID sequence with a correction pattern to generate a modified scrambled PON frame, and a network interface that transmits the modified scrambled PON frame.

In another aspect, a network system comprises a public network, one or more optical network units (ONUs), and an optical line terminal (OLT). The OLT comprises a framer that encapsulates at least a portion of a passive optical network (PON) packet to form a PON frame, a scrambler that applies a scrambling polynomial to at least a portion of the PON frame to generate a scrambled PON frame, a consecutive identical digit (CID) checker that determines that the scrambled PON frame comprises a CID sequence greater than a threshold length and replaces the determined CID sequence with a correction pattern to generate a modified scrambled PON frame, and a network interface that transmits the modified scrambled PON frame to each of the one or more ONUs using the public network.

In another aspect, a computer-readable medium comprises instructions for causing a programmable processor to encapsulate at least a portion of a data packet to form a passive optical network (PON) frame, apply a scrambling polynomial to at least a portion of the PON frame to generate a scrambled PON frame, determine that the scrambled PON frame comprises a consecutive identical digit (CID) sequence greater than a threshold length, replace the determined CID sequence with a correction pattern to generate a modified scrambled PON frame, and transmit the modified scrambled PON frame.

In another aspect, a computer-readable medium comprises instructions for causing a programmable processor to receive a modified scrambled passive optical network (PON) frame, determine that a payload of the modified scrambled PON frame includes a correction pattern, replace the determined correction pattern with a consecutive identical digit (CID) sequence to form a scrambled payload, apply an inverse scrambling polynomial to the scrambled payload to form a descrambled payload, and transmit a data packet that includes the descrambled payload.

In another aspect, a method comprises determining, by an optical network device, whether a data packet will result in a consecutive identical digit (CID) error prior to encapsulating at least a portion of the data packet to form a passive optical network (PON) frame, and in response to the determination that the data packet will result in the CID error, modifying the data packet to form at least one modified data packet that will not result in the CID error upon subsequent encapsulation and scrambling of the at least one modified data packet. The method further comprises encapsulating, by the optical network device, at least a portion of the at least one modified data packet to form the PON frame, applying, by the optical network device, a scrambling polynomial to at least a portion of the PON frame to form a scrambled PON frame, and transmitting, by the optical network device, the scrambled PON frame.

In another aspect, an optical network device comprises a control unit, a consecutive identical digit (CID) corrector of the control unit that determines whether a data packet will result in a CID error prior to encapsulating at least a portion of the data packet to form a passive optical network (PON) frame and, in response to the determination that the data packet will result in the CID error, modifies the data packet to form at least one modified data packet that will not result in the CID error upon subsequent encapsulation and scrambling of the at least one modified data packet. The optical network device further comprises a framer of the control unit, wherein the framer encapsulates at least a portion of the at least one modified data packet to form the PON frame, a scrambler of the control unit, wherein the scrambler applies a scrambling polynomial to at least a portion of the PON frame to form a scrambled PON frame, and a network interface that transmits the scrambled PON frame.

In another aspect, a computer-readable medium comprises instructions for causing a programmable processor to determine that a data packet will result in a consecutive identical digit (CID) error prior to encapsulating at least a portion of the data packet to form a passive optical network (PON) frame, and in response to the determination that the data packet will result in the CID error, modify the data packet to form at least one modified data packet that will not result in the CID error upon subsequent encapsulation and scrambling of the at least one modified data packet. The computer-readable medium further comprises instructions for causing the programmable processor to encapsulate at least a portion of the at least one modified data packet to form the PON frame, apply a scrambling polynomial to at least a portion of the PON frame to form a scrambled PON frame, and transmit the scrambled PON frame.

In another aspect, a network system comprises a public network, one or more optical network units (ONUs), and an optical line terminal (OLT). The OLT comprises a consecutive identical digit (CID) corrector that determines that a data packet will result in a CID error prior to encapsulating at least a portion of the data packet to form a passive optical network (PON) frame and, in response to the determination that the data packet will result in the CID error, modifies the data packet to form at least one modified data packet that will not result in the CID error upon subsequent encapsulation and scrambling of the at least one modified data packet, a framer that encapsulates at least a portion of the at least one modified data packet to form the PON frame, a scrambler that applies a scrambling polynomial to at least a portion of the PON frame to form a scrambled PON frame, and a network interface that transmits the scrambled PON frame to each ONU of the one or more ONUs using the public network.

In another aspect, a method comprises receiving, by an optical network device, a scrambled passive optical network (PON) frame, determining, by the optical network device, that a scrambled payload of the scrambled PON frame includes data associated with at least one modified data packet, and applying, by the optical network device, an inverse scrambling polynomial to the scrambled payload to form a descrambled payload. The method further comprises constructing at least one data packet from the data associated with the at least one modified data packet at least in part by replacing at least a portion of the descrambled payload with a CID sequence, and transmitting, by the optical network device, the at least one data packet.

In another aspect, an optical network device comprises passive optical network (PON) interface that receives a scrambled PON frame, a passive optical network media access controller (PON MAC) that determines that a scrambled payload of the scrambled PON frame includes data associated with at least one modified data packet, and applies an inverse scrambling polynomial to the scrambled payload to form a descrambled payload, a CID corrector that constructs at least one data packet from the data associated with the at least one modified data packet at least in part by replacing a portion of the descrambled payload with a CID sequence, and a network interface that transmits the at least one data packet.

In another aspect, a computer-readable medium comprises instructions for causing a programmable processor to receive a scrambled PON frame, determine that a scrambled payload of the scrambled PON frame includes data associated with at least one modified data packet, apply an inverse scrambling polynomial to the scrambled payload to form a descrambled payload, construct at least one data packet from the data associated with the at least one modified data packet, and transmit the at least one data packet.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
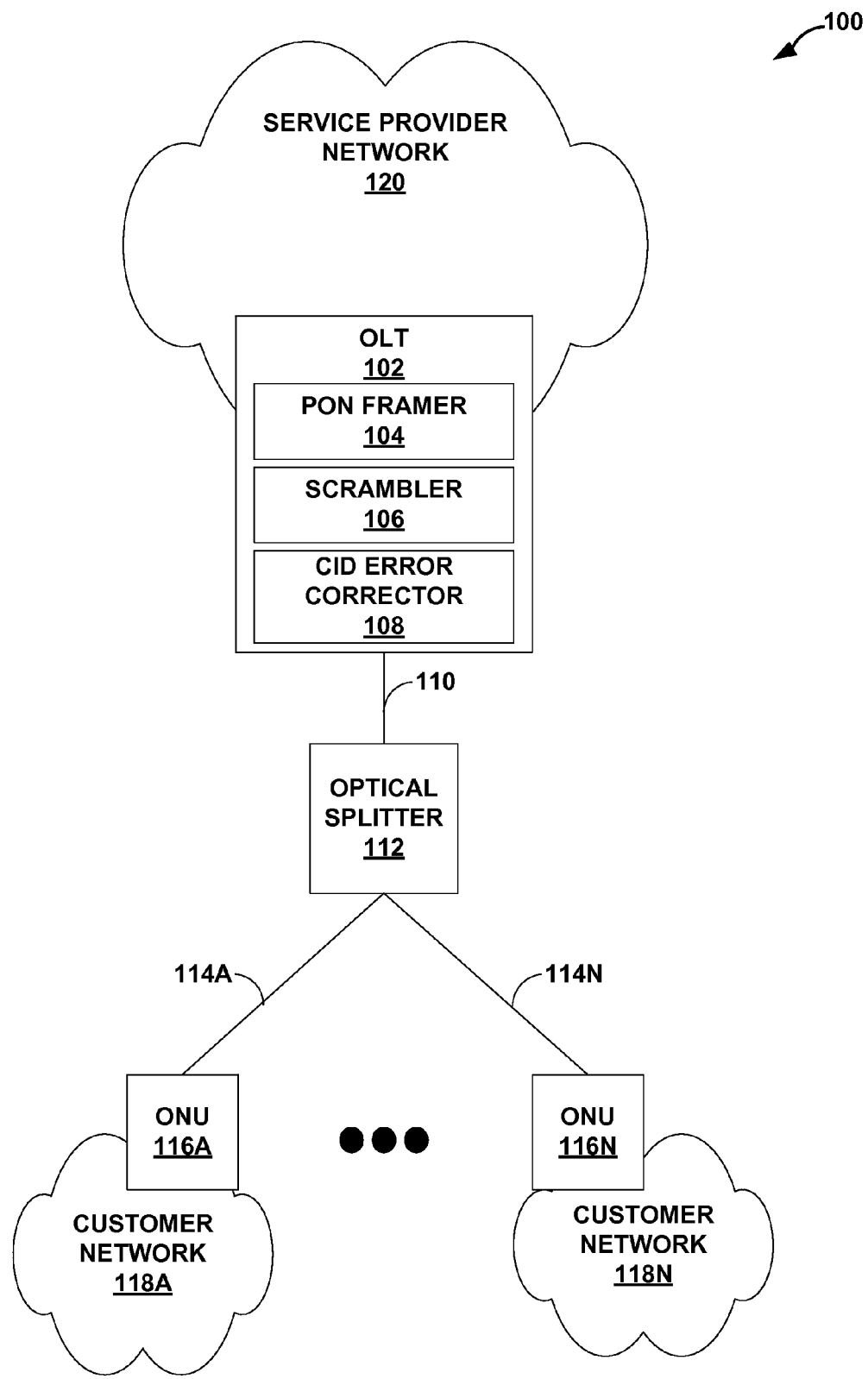
FIG. 1 is a block diagram illustrating a network system including an optical line terminal that implements CID error detection and correction in accordance with one or more aspects of the present disclosure.

FIG. 1 is a block diagram illustrating a network system 100 including an optical line terminal ("OLT") 102 that implements consecutive identical digit ("CID") correction in accordance with one or more aspects of the techniques described in this disclosure. Network system 100 may conform to any of a variety of optical network standards that utilize bit transitions to synchronize timing, such as broadband PON (BPON) (ITU G.983), gigabit-capable PON (GPON) (ITU G.984), XGPON or 10G-PON (ITU 987), gigabit Ethernet PON (GEPON) (IEEE 802.3), active optical network (AON) (IEEE 802.3ah), and the like. For purposes of illustration only, network system 100 is assumed to represent a system that conforms to the GPON standard. While described with respect to a particular type of system, i.e., one that conforms to the GPON standard, the techniques may be implemented by any network system that utilize bit transition to facilitate or preserve synchronous timing between two or more network elements.

In the example shown in FIG. 1, network system 100 includes a service provider network 120 and customer networks 118A-118N ("customer networks 118"). Service provider network 120 represents a network that is commonly owned and operated by a service provider to provide one or more services to customer networks 118. Service provider network 120 may provide a number of different services to customer networks 118, including a voice service (often in the form of voice over Internet protocol or VoIP), a data service (which may be referred to as an Internet service or data plan) and a video service (which may be referred to as Internet protocol television or IPTV). Service provider network 120 is often a layer-three packet switched network that implements the third layer of the Open System Interconnection (OSI) reference model, where reference to layers in this disclosure may refer to layers of this OSI reference model.

Customer networks 118 may represent any network that is owned and operated by the customer of the service provider. Customer networks 118 may each include customer premise equipment (CPE), which are not shown in the example of FIG. 1 for ease of illustration purposes. CPE represent any device that may consume one or more of the services to which the corresponding customer subscribes. Examples of CPE may include television set-top boxes, telephones, tablet computers, laptop computers, workstations, desktop computers, netbooks, mobile phones (including so-called "smart phones"), video gaming devices, Internet-ready televisions, Internet-ready disc players, portable gaming devices, personal digital assistant (PDA) devices, routers, hubs, gateways, printers or any other device capable of receiving or otherwise interfacing with the services provided via service provider network 120.

Customer networks 118 are increasingly demanding more bandwidth within service provider network 120 to increasingly receive more and more services via the Internet rather than via separate communication systems (such as a cable network or a plain old telephone system). Moreover, service providers may increasingly prefer to maintain only a single data network for administrative and cost reasons, leading to a network architecture where all services are converging on the packet switched network for delivery to customer networks 118. While cable networks and the plain old telephone system (POTS) may support delivery of data services in conjunction with either video or voice, these networks do not commonly provide sufficient bandwidth to support all three going forward, especially as delivery of video data is increasingly requiring ever growing amounts of bandwidth (considering that higher-resolution video is currently in high demand by many customers).

To meet both current demand and expected customer demand going forward, many service providers are forgoing previous cable networks or POTS to provide optical networks as the "last mile," meaning the last mile to the customer. Optical networks provide large amounts of bandwidth to the customer at considerable speeds. Network system 100 may represent one example of an optical network that is coupled to customer networks 118 via optical link 110, splitter 112 and optical links 114A-114N ("optical links 114"). Network system 100 may comprise a passive optical network (PON) or an active optical network (such as those referred to as an active Ethernet (AE) optical network). Regardless, network system 100 may conform to one of the standards referenced above.

Network system 100 includes an optical line terminal 102 ("OLT 102") and optical network units 116A-116N ("ONUs 116"). OLT 102 terminates the line coupling customer networks 118 to service provider network 120, while ONUs 116 each provide one or more interfaces between customer networks 118 and service provider network 120. OLT 102 generally represents any optical device that aggregates traffic from ONUs 116 for delivery upstream via service provider network 120 to the Internet or other destination and separates traffic from the Internet or other source for delivery downstream to separate customer networks 118.

In the example of FIG. 1, OLT 102 is coupled to optical splitter 112 using optical fiber line 110. As shown in FIG. 1, optical splitter 112 may further be coupled to one or more ONUs 116 using optical fiber lines 114. In some examples, optical splitter 112 receives data from OLT 102 in the form of an "optical signal" and distributes the optical signal to ONUs 116. More specifically, optical splitter 112 "splits" this optical signal to generate multiple copies of the received optical signal, transmitting a copy to each of ONUs 116. In these and other examples, optical splitter 112 may split an optical signal by first identifying a set of wavelengths included in the optical signal, and then generating multiple optical signals, each including a different subset of the set of wavelengths. For purposes of illustration only, and in accordance with the GPON standard, optical splitter 112 is presumed to be a so-called "passive optical splitter," i.e. optical splitter 112 splits an optical signal received from OLT 102 by generating multiple copies (or "optical sub-signals") of the signal and distributes the optical sub-signals to ONUs 116 using ONU lines 114 in the example of GPON. In some examples, optical splitter 112 may include, be part of, or be coupled to an optical combiner. In these examples, optical splitter 112 may receive optical sub-signals from ONUs 116, then multiplex the received optical sub-signals into a combined optical signal, and then transmit the combined optical signal to OLT 112.

Each of ONUs 116 couples to customer networks 118. In some examples, one or more of customer networks 118 may represent an enterprise network. Some enterprise networks may support enterprises that provide critical or highly-sought after products, care or functions, such as hospitals that may own and operate customer network 118A, for example, to deliver life-saving care. In this example, ONU 116A may receive and transmit data that includes prescriptions, patients' medical records, and medical images such as X-rays and MRIs, and a wide variety of other medical data. Should customer network 118A lose connectivity to the services offered by service provider network 120, the doctors, nurses and other medical staff may be unable to retrieve this medical data and use this data to provide care, which may be potentially life-saving, required by their patients. Consequently, some customers may require a high level of reliability in receiving services provided by service provider network 120.

One way by which connectivity between service provider network 120 and customer networks 118 may be lost is when ONUs 116 and OLT 102 lose the synchronous timing between each other. Optical networks commonly operate by allocating a dedicated time slot to each included optical device. One common example of a time allocation method used by optical networks is known as time division multiple access (or "TDMA"). For example, OLT 102 may transmit downstream traffic during one or more time slots reserved exclusively for OLT 102. Similarly, each of ONUs 116 may respective transmit upstream bursts during exclusively reserved time slots (e.g., ONU 116A during its reserved time slots, ONU 116N during its reserved time slots, etc.). To assist OLT 102 and ONUs 116 in adhering to their time allocations, OLT 102 and ONUs 116 may each be equipped with a clock. In turn, OLT 102 and ONUs 116 may synchronize clocks with one another. Through clock synchronization, OLT 102 and ONUs 116 may achieve "synchronous timing" and thereby coordinate their activities of transmitting and receiving data. For example, during a time slot reserved for downstream transmission by OLT 102, each of ONUs 116 may operate in a "standby state," i.e. each of ONUs 116 may be prepared to receive data transmitted by OLT 102. If ONU 116A, for example, loses synchronous timing with OLT 102, ONU 116A may not operate in standby state during a time slot reserved for downstream transmission by OLT 102. As a result, ONU 116A may not be able to receive data transmitted downstream by OLT 102. In this way, loss of synchronous timing between ONUs 116 and OLT 102 may result in loss of data.

Loss of synchronous timing in optical networks may result due to the occurrence of consecutive identical digits (CID) exceeding a programmed length. Optical networks, such as network system 100, may rely on bit transitions to preserve synchronous timing between included optical devices such as OLT 102 and ONUs 116. For example, during periods of inactivity, OLT 102 and/or ONUs 116 may transmit so-called "timing signals" which include regular transitions between ones and zeros. Additionally, during, times of activity, network system 100 may rely on the presence of sufficient bit transitions in the downstream traffic and upstream bursts to preserve synchronous timing between OLT 102 and ONUs 116. If a downstream transmission includes CID exceeding the programmed length, ONUs 116 may lose synchronous timing with OLT 102, causing potential loss of data. Additionally, ONUs 116 and may not be able to regain synchronous timing with OLT 102 until the next instance of bit transition in the continuous downstream transmission from OLT 102. Similarly, if an upstream burst from ONU 116A includes CID exceeding the programmed length, OLT 102 may experience a state known as "loss of signal" (LOS). In this scenario, OLT 102 may not recover from LOS state until a subsequent upstream burst from any of ONUs 116 that includes a bit transition. In either case, CID exceeding the programmed length may potentially cause network system 100 to lose synchronous timing for a relatively long period of time until a bit transition restores synchronous timing.

In an attempt to reduce the probability that data sent from OLT 102 does not include CID exceeding the programmed length, OLT 102 may perform a number of steps to process a packet received from service provider network 120. As shown in the example of FIG. 1, OLT 102 may include a PON framer 104 and a scrambler 106. PON framer 104 represents a module or unit that encapsulates packets to form a "PON frame." PON framer 104 may, for example, perform a framing method referred to as the Generic Encapsulation Method ("GEM") to encapsulate packets and thereby form a PON frame. More information concerning GEM can be found in the GPON standard (ITU-T G984), published by the International Telecommunication Union Telecommunication Standardization Sector, which is hereby incorporated by reference as if set forth in its entirety. A PON frame formed using GEM includes data known as a "GEM header" and a so-called "payload" that includes one or more packets or a portion of a packet. A GEM header includes 5 bytes of data, while the size of the payload may vary from one PON frame to another. The position of the payload within a PON frame may vary from one PON frame to another. More specifically, PON framer 104 may position a payload in one of 512 possible positions within a PON frame. In accordance with GEM, PON framer 104 may exhaust all 512 possible positions before repeating a position. In other words, a first PON frame and a 513th PON frame formed by PON framer 104 may include their respective payloads at matching positions.

Scrambler 106 represents a module or unit that converts the PON frame into a scrambled PON frame in an attempt to prevent CID. That is, scrambler 106 may scramble PON frames to avoid payloads of such PON frames from having CID. Scrambler 106 may use published and well-known scrambling techniques. For example, scrambler 106 may apply the scrambling polynomial defined in the above noted GPON standard to a PON frame. The scrambling polynomial defined in the GPON standard is as follows:

$$x^7 + x^6 + 1$$

Using this scrambling polynomial, scrambler 106 may reduce the number of scrambled PON frames with payloads that include long runs of either ones or zeros (or, in other words, reduce the occurrence of CID). The GPON standard defines an acceptable CID length of 72. As a result, an optical network device conforming to the GPON standard may recognize 72 as a "threshold length" for CID. In other words, if OLT 102 transmits a scrambled PON frame with a payload containing 73 or more consecutive ones or zeros, ONUs 116 may lose synchronous timing. More specifically, if ONUs 116 receive a PON frame with a payload containing CID with a length of 73 or more, ONUs 116 may recognize a "CID error" and lose synchronous timing with OLT 102. ONUs 116 may not be able to regain synchronous timing with OLT 102 immediately thereafter. More specifically, ONUs 116 may need to wait until the next instance of a bit transition in the continuous downstream transmission from OLT 102. Similarly, if OLT 102 receives a scrambled PON frame (e.g. from one or more of ONUs 116) with a payload containing CID of length 73 or greater, OLT 102 may experience a condition defined as "loss of signal" or "LOS" in the GPON standard.

While CID may occur naturally, a larger threat may come in the form of malicious attempts to force CID, especially considering the growing adoption of PONs and their use in delivering services to an increasing number of customers that demand a high-level of reliability in the delivery of such services. Hackers or other malicious users may leverage the well-known and widely published nature of these scrambling polynomials to induce or otherwise force instances of CID to arise in the PON with the express intent of disrupting the network, which may prevent, as noted above, services from reaching these customers that require a high level of reliability in the delivery of these services.

For example, a hacker may implement a malicious program that generates and sends malicious packets to OLT 102. In this example, the malicious program may generate a packet such that when the scrambling polynomial of the current GPON standard is applied to the packet, the resulting output contains a CID error. Since PON framer 104 may place a payload in one of 512 positions within a PON frame, and PON framer 104 may exhaust all 512 possible positions before repeating the cycle, the malicious program needs to send only some multiple, which may be very low, of 512 malicious packets before causing a first CID error. Such a malicious program may be able to generate and send a high number of packets within a brief interval of time. As a result, a malicious user or program may cause a very high number of CID errors on a PON over a period of time, which may result in significant loss of timing between OLT 102 and ONUs 116, causing errors in delivery of data between OLT 102 and ONUs 116 if not entirely disabling communication between OLT 102 and ONUs 116, possibly preventing delivery of any services to ONUs 116.

Moreover, the odds of a hacker or malicious program causing a CID error on a PON may have increased as PON standards have evolved. For example, some earlier PON standards employed a protocol known as asynchronous transfer mode (ATM), where these PONs that implement ATM were referred to as "ATM PONs," "A-PONs" or "APONs." The APON standard provided for PON frames that have a maximum payload length of 384 bits (48 bytes). Similar to the current GPON standard, the APON standard defined a CID error as a CID run exceeding 72 bits in length. As a result, an APON implementing the earlier APON standard may have faced lower odds of encountering a CID error. A malicious packet may have been fragmented in more instances, spreading the data of the malicious packet over multiple PON frames. Once fragmented, the chances of a 72-bit long CID run may diminish substantially. Furthermore, an APON implementing the earlier APON standard may have been able to recover faster from a loss of synchronous timing due to a CID error. Even if a CID error encompassed the entire 384-bit length of a PON frame's payload, a receiving optical network device may only need to wait for the next PON frame for the bit transition necessary to regain synchronous timing with other devices on the PON.

In contrast, the current GPON standard permits a maximum payload length of 32,768 bits (4,096 bytes). However, as discussed, the current GPON standard still defines a CID error as a CID run that exceeds 72 bits in length. Because of the longer payloads possible under the current GPON standard, a network, such as network system 100, implementing the current GPON standard may face increased risks of losing synchronous timing due to a CID error. For example, if OLT 102 receives a malicious packet, and then forms and transmits a PON frame with the full 32,768 bit-long payload, chances are much greater that the CID error will be contained entirely within the PON frame's payload. In other words, the odds of the CID occurring towards the end of the payload, causing PON framer 104 to fragment the packet into sub-packets of 72 bits or less, may have diminished with the evolution of the current GPON standard. As a result, networks implementing the current GPON standard may face a substantially higher risk of losing synchronous timing due to CID error, and may suffer longer recovery times from any such loss of synchronous timing.

In accordance with the techniques described in this disclosure, OLTs 102 (and ONUs 116, as described below in more detail, but not shown in the example of FIG. 1 for ease of illustration purposes) include a CID error corrector 108. CID error corrector 108 represents a module or unit that implements the techniques described in this disclosure to provide an additional level of CID error detection and correction. Should a malicious program or user target the PON in an attempt to leverage the well-known scrambling functions such that scrambler 106 outputs CID that cause the PON to lose its synchronous timing, CID error corrector 108 may detect this CID and replace this CID with a correction pattern that enables OLT 102 and ONUs 116 to maintain their synchronous timing. In this manner, techniques of this disclosure may prevent malicious attacks that attempt to utilize the security vulnerabilities of the PON scrambling functions as the source of PON attacks by providing an additional level of CID error detection and correction that may remove security vulnerabilities associated with the scrambling functions.

In operation, OLT 102 may implement the techniques of the present disclosure in the form of CID error corrector 108. To illustrate, PON framer 104 may encapsulate at least a portion of a data packet to form a PON frame in the manner described above. Scrambler 106 may apply the above noted scrambling polynomial to at least a portion of the PON frame to generate a scrambled PON frame, again as described above. CID error corrector 108 of OLT 102 may then inspect the scrambled PON frame includes a CID sequence greater than a threshold length (e.g., 72, as described in the current GPON standard). If CID error corrector 108 determines that the scrambled PON frame includes a CID sequence greater than the threshold length (hereinafter, a "CID error"), CID error corrector 108 may then replace the determined CID sequence with a correction pattern to generate a modified scrambled PON frame. An example of a correction pattern is a sequence of alternating ones and zeros. OLT 102 may transmit the modified scrambled PON frame over optical fiber line 110 to ONUs 116.

In some examples, CID error corrector 108 may "flag" the modified scrambled PON frame that includes a CID error. For example, CID error corrector 108 may flag a modified scrambled PON frame containing a CID error by inserting a proprietary character (or "correction flag") in a particular bit of the PON frame's GEM header. CID error corrector 108 may insert a second proprietary character (or "error-type indicator") in another bit of the GEM header. The error-type indicator may indicate the nature of the CID error, i.e. whether the CID error was caused by a run of consecutive ones or a run of consecutive zeros. By flagging the modified scrambled PON frame in this manner, CID error corrector 108 may enable ONUs 116 to identify incoming communications that were corrected for CID error. Further, CID error corrector 108 may use the error-type indicator to enable ONUs 116 to identify the specific nature of a CID error that was detected and corrected. In this manner, CID error corrector 108 may not only protect ONUs 116 from losing synchronous timing due to CID errors, but may also continually inform ONUs 116 about data that was corrected for CID error. OLT 102 may then transmit the PON frame downstream to ONUs 116. As discussed, after OLT 102 transmits the PON frame, optical splitter 112 may generate multiple copies of the PON frame and distribute a copy to each of ONUs 116. ONUs 116 may perform a number of steps to process the received PON frame. In many instances, ONUs 116 may descramble the payload of the received PON frame. To descramble the payload, ONUs 116 may first identify the payload using "packet qualifiers" extracted from the PON frame. ONUs 116 may then apply the inverse of the scrambling polynomial applied by scrambler 106. For example, where scrambler 106 applies the scrambling polynomial specified in the current GPON standard (namely, $x^7+x^6+1$), ONUs 116 may include a derivation of the inverse of the scrambling polynomial, and apply the inverse scrambling polynomial to the scrambled payload, forming a descrambled payload. ONUs 116 may then descramble a portion of the header, as well. In accordance with the current GPON standard, ONUs 116 may descramble all portions of the header except for two fields known as the preamble and the delimiter. ONUs 116 may then reverse the encapsulation process performed by PON framer 104. For example, ONUs 116 may remove the GEM header from the PON frame, leaving only the payload. Since the payload may be generated from (or be an exact replica of) the original data packet received by OLT 102 from service provider network 120, ONUs 116 may generate a data packet, which ONUs 116 may then forward over respective customer networks 118. In other examples, ONUs 116 may first reverse the encapsulation process, and then descramble the scrambled payload before forwarding the resulting data packet.

In this manner, ONUs 116 may implement the techniques described in this disclosure to perform one or more additional steps on the received PON frame before forwarding the data packet over customer networks 118. More specifically, ONUs 116 may perform one or more steps in relation to the steps performed by CID error corrector 108. For example, ONUs 116 may inspect the GEM header of the PON frame for the presence of a correction flag. If ONUs 116 detect a correction flag in the GEM header of the PON frame, ONUs 116 may determine that the PON frame was corrected for CID error, and thus contains a correction pattern (e.g., in some or all of the payload). Additionally, if ONUs 116 detect a correction flag in the GEM header, ONUs 116 may inspect the GEM header for an error-type indicator. Based on the value of the error type indicator, ONUs 116 may determine the nature of the CID error that was corrected, i.e. whether the CID error was caused by a run of ones or a run of zeros.

In some instances, ONUs 116 may collect other information and take further actions based on the detection of a correction flag. For example, ONUs 116 may maintain a count of CID-corrected PON frames received. In addition, ONUs 116 may categorize the count, e.g. according to internet protocol (IP) addresses of the originating devices connected via service provider network 120. In some examples, if a particular originating device exceeds a threshold number of CID-corrected PON frames, ONUs 116 may drop some or all future PON frames associated with the IP address of the originating device. In some such examples, ONUs 116 may issue a software alarm upon receiving a PON frame associated with the IP address of the originating device. In other examples, ONUs 116 may categorize originating devices by their device IDs or media access control (MAC) addresses instead of IP addresses.

Figure 2:
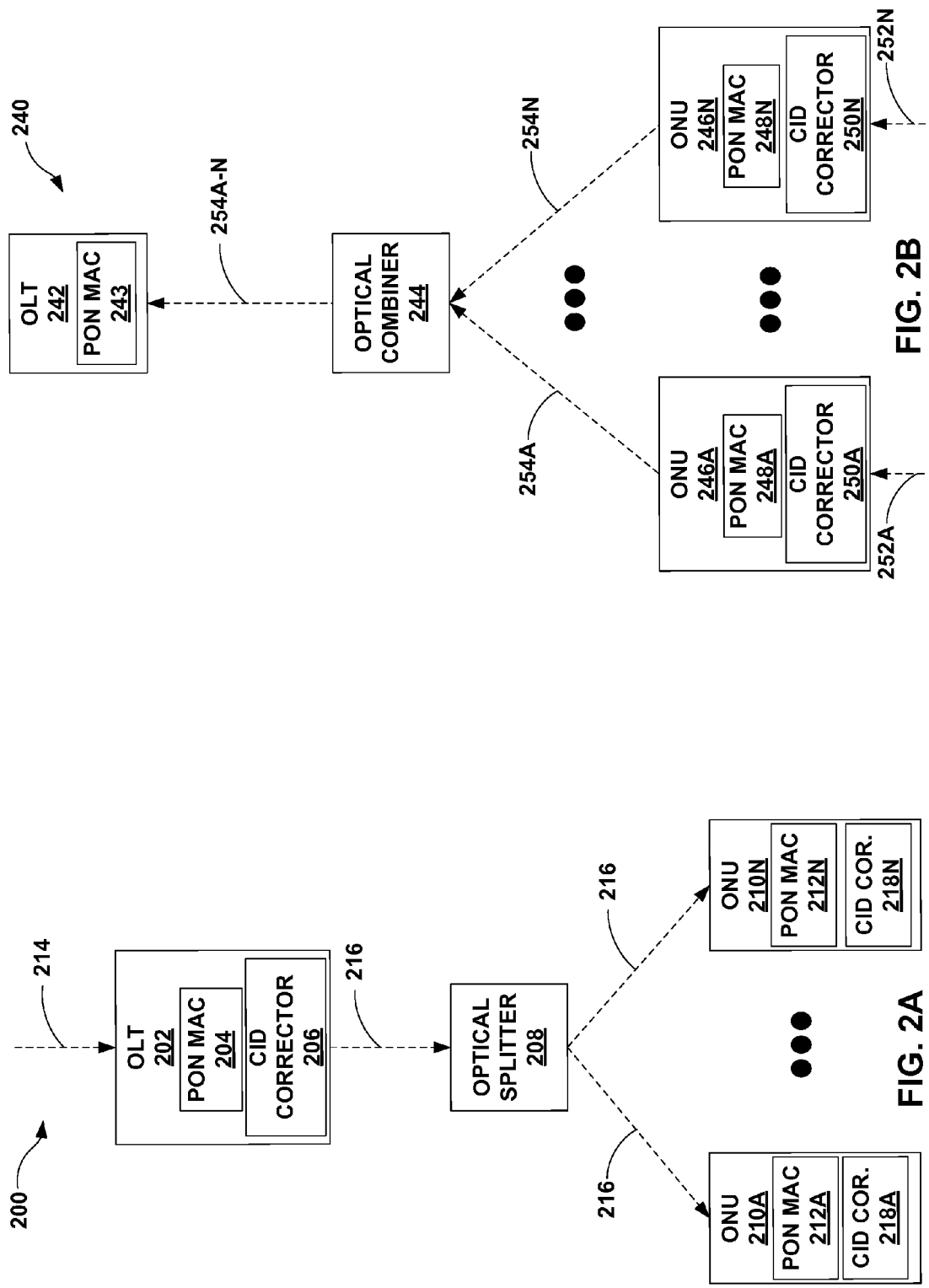
FIGS. 2A & 2B are block diagrams illustrating downstream traffic from an optical line terminal and upstream bursts from one or more optical network units of network systems in accordance with one or more aspects of the present disclosure.

FIGS. 2A & 2B are block diagrams illustrating downstream traffic from an optical line terminal ("OLT") and upstream bursts from one or more optical network units ("ONUs") of respective network systems 200 and 240 in accordance with one or more aspects of the present disclosure. FIG. 2A illustrates downstream traffic in an example network system 200. Network system 200 includes OLT 202, optical splitter 208, and one or more ONUs 210A-210N (ONUs 210). OLT 202 further includes passive optical network media access controller (PON MAC) 204 and consecutive identical digit (CID) corrector 206. ONUs 210 further include PON MACs 212A-212N ("PON MACs 212").

As discussed, OLT 202 may receive data from a network (e.g., service provider network 120 of FIG. 1) in the form of data packets. In the example of FIG. 2A, OLT 202 receives packet 214 from such a network. OLT 202 may perform one or more steps on packet 214 before transmitting it downstream to ONUs 210. For example, PON MAC 204 may encapsulate packet 214 using GEM to form a PON frame, such as frame 216. Frame 216 may include at least two components, namely, a "GEM header" and a "payload."

Generally, a GEM header is defined in the GPON standard to have a length of 5 bytes. A typical GEM header may include data arranged in distinct "fields." For example, a GEM header of frame 216 may include a "payload length" field that includes data indicating the length of the payload of frame 216. In this and other examples, the GEM header of frame 216 may include a "port-ID" field. The port-ID field may be 12 bits in length, and may enable a downstream ONU to identify frame 216. In these and other examples, the GEM header of frame 216 may include a "payload type indicator" (PTI) field that includes data associated with the payload of frame 216.

The second component of frame 216 may be a so-called "payload." Generally, a payload may include data associated with the packet from which the PON frame was generated. The length of a payload is variable, i.e. different PON frames may include payloads of varying lengths. In some examples, the payload may be identical to the packet from which the PON frame was generated. For example, frame 216 may include a payload that is an exact replica of packet 214. In this manner, PON MAC 204 may "encapsulate" packet 214 to form PON frame 216.

PON MAC 204 may then scramble the payload of frame 216. As discussed, PON frames may be scrambled to reduce the occurrence of CID errors, since a CID error may cause the optical network devices in a PON to lose their synchronous timing. For example, if the payload of frame 216 includes a CID error, one or more of ONUs 210 may lose synchronous timing with OLT 202. To reduce the probability of a CID error, PON MAC 204 may scramble the payload of frame 216 by applying a scrambling polynomial (e.g., the scrambling polynomial described in the GPON standard) to the payload.

However, scrambling alone may not be sufficient to ensure that the payload of frame 216 does not contain a CID error for the reasons described above. Since the GPON standard is a publicly available document, a malicious user or program may leverage the scrambling polynomials openly described in the standard to generate a packet that, when scrambled using this scrambling polynomial, results in the occurrence of a CID error. For example, a hacker or malicious program may derive an inverse function of the scrambling polynomial, and apply the inverse function to CID sequences that exceed the threshold length. In this manner, the malicious program may arrive at one or more packet constructions that cause the scrambling polynomial to output a CID error. As a result, if such a malicious program generates packet 214, then applying the GPON standard's scrambling polynomial (which is currently specified as $x^7 + x^6 + 1$) to packet 214 may result in a sequence of consecutive identical digits (e.g., of ones or zeros) that exceeds a threshold length (e.g., 72 bits). In such a case, packet 214 may be termed a "malicious packet" for purposes of example.

To potentially protect network system 200 from issues caused by a malicious packet (e.g. ONUs 210 losing synchronous timing with OLT 202 due to a CID error), CID corrector 206 of OLT 202 may inspect the payload of frame 216 for the presence of one or more CID errors. If CID corrector 206 detects a CID error in the payload of frame 216, CID corrector 206 may replace a portion of the payload with a "correction pattern." In one example, CID corrector 206 may replace a segment of the payload that includes the CID error. In another example, CID corrector 206 may replace a segment of the payload that includes the CID error, and the remainder of the payload located immediately after the CID error. In still another example, CID corrector 206 may replace the entire payload with the correction pattern. In certain contexts, CID corrector 206 may drop the packet upon detecting the CID error without replacing any segments of the payload.

When replacing a segment of the payload that includes the CID error, CID corrector 206 may vary the nature of the correction pattern. In one example, the correction pattern may be a run of alternating ones and zeros. By using a correction pattern of alternating ones and zeros, CID corrector 206 may ensure the maximum possible number of bit transitions in the replaced portion of the payload. By causing the payload of frame 216 to include a high number of bit transitions, CID corrector 206 may provide ONUs 210 several opportunities to regain synchronous timing with one another and with OLT 202. In this manner, CID corrector 206 may provide both detection and correction of CID errors in accordance with one or more aspects of the present disclosure.

OLT 202 may then transmit frame 216 over network system 200. As shown in FIG. 2A, OLT 202 may transmit frame 216 to ONUs 210 via optical splitter 208. In PONs, optical splitter 208 may represent a passive optical splitter. Optical splitter 208 may "split" transmissions received from OLT 202 by generating multiple copies of the received transmission, and sending each copy as what may be considered as an "optical sub-signal" to one of ONUs 210. In the example of FIG. 2A, optical splitter 208 receives, splits, and distributes a PON frame (namely, frame 216). Each of ONUs 210 receives an identical copy of frame 216. As a result, FIG. 2A illustrates "point-to-multipoint" nature of downstream traffic in network system 200. In this regard, FIG. 2A illustrates how CID corrector 206, in implementing the techniques described in this disclosure, may protect a large number of ONUs (e.g., ONUs 210) from losing synchronous timing with OLT 202 due to a malicious user or program.

As shown in FIG. 2A, ONUs 210 may also include CID correctors 218 A-N ("CID correctors 218"). In the downstream traffic illustration of FIG. 2A, CID correctors 218 perform one or more functions that may be viewed as the inverse of functions performed by CID corrector 206 of OLT 202. For example, CID correctors 218 may inspect frame 216 for CID correction. More specifically, CID correctors 218 may inspect the header of frame 216 for the presence of a correction flag. If CID correctors 218 detect a correction flag in the header of frame 216, CID correctors 218 may further inspect the header for an error-type indicator. Based on the error-type indicator, CID correctors 218 may replace a portion of the payload of frame 216 with a CID sequence. In this manner, CID correctors 218 may assist ONUs 210 in reconstructing packet 214.

ONUs 210 may also include PON MACs 212A-212N ("PON MACs 212"). ONUs 210 may use PON MACs 212 to perform operations that may be viewed as the inverse of operations performed by PON MAC 204 of OLT 202. More specifically, ONUs 210 may use PON MACs 212 to convert payloads of PON frames to reflect the payloads' states before PON MAC 204 applied the scrambling polynomial to the payloads. For example, PON MACs 212 may descramble the payload of frame 216 by applying a descrambling polynomial to the payload. As discussed, the scrambling polynomial applied by PON MAC 204 is published in the current GPON standard. As a result, PON MACs 212 may derive the descrambling polynomial that reverses the effects of the scrambling polynomial. After PON MACs 212 descramble the payload of frame 216, the payload of frame 216 may revert to its pre-scrambled state (e.g., the payload may then include content that is identical to the content of packet 214). In instances where CID correctors 218 replaced a portion of the payload of frame 216 with a CID sequence, PON MACs 212 may descramble the payload (with the CID sequence) to arrive at packet 214. In this manner, PON MACs 212 and CID correctors 218 may operate collaboratively to reconstruct packet 214 even if packet 214 caused a CID error when scrambled by OLT 202.

FIG. 2B illustrates upstream traffic in an example network system 240. Network system 240 includes one or more ONUs 246A-246N (ONUs 246), optical combiner 244, and OLT 242. ONUs 246 further include passive optical network media access controllers 248A-248N (PON MACs 248) and consecutive identical digit correctors 250A-250N (CID correctors 250). Upstream traffic sent from ONUs 246 to OLT 242 may be viewed as one or more "upstream bursts." More specifically, each of ONUs 246 may transmit data to OLT 242 during a designated time slice. For example, ONU 246A may transmit data to OLT 242 during a time slice reserved specifically for ONU 246.

As discussed with regards to downstream traffic illustrated in FIG. 2A, upstream bursts may be transmitted in the form of frames, in accordance with the GPON standard. More specifically, ONUs 246 may transmit frames 254 A-N ("frames 254) to OLT 242. For example, ONU 246A may receive data in the form of packets, for instance, from an enterprise site associated with ONU 246A. FIG. 2B illustrates an example where ONU 246A receives packet A. ONU 246A may then utilize PON MAC 248A to encapsulate packet A using GEM to form frame 254A. Similar to PON MAC 204 described with respect to FIG. 2A, PON MAC 248A may scramble the payload of frame 254A using the scrambling polynomial described in the GPON standard.

Similar to CID corrector 206 described with respect to FIG. 2A, CID corrector 250A may inspect frame 254A for the presence of one or more CID errors. For instance, if CID corrector 250A detects a CID error in the payload of frame 254A, CID corrector 250A may replace a portion of the payload with a correction pattern. In some examples, CID corrector 250A may use a correction pattern that includes a run of alternating ones and zeros.

ONUs 246 may then transmit frames 254 to OLT 242, through optical combiner 244. Optical combiner may include, be part of, or be otherwise coupled to an optical splitter, such as optical splitter 208, which splits downstream traffic in network system 240. Optical combiner 244 may receive frames as part of upstream bursts from ONUs 246, and transmit the frames upstream to OLT 242. In some examples, optical combiner 244 may combine frames included in various upstream bursts from ONUs 246, and send a combined optical signal to OLT 242. In the example of FIG. 2B, optical combiner 244 receives frames 254 from ONUs 246, and forwards frames 254 as a single optical signal to OLT 242.

As shown in FIG. 2B, OLT 242 may include PON MAC 243. PON MAC 243 may operate similarly to PON MACs 212 illustrated in FIG. 2A. More specifically, PON MAC 243 may derive a descrambling polynomial based on the published scrambling polynomial applied by PON MACs 248. PON MAC 243 may then apply the descrambling polynomial to the payload of each of frames 254. By applying the descrambling polynomial, PON MAC 243 may cause the payloads to revert to their pre-scrambled state (e.g., the payloads of frames 254 may include content identical to the content of packets A-N respectively).

A potential advantage provided by CID correctors 250 is described below. In the case of upstream bursts (illustrated in FIG. 2B), a CID error may cause OLT 242 to experience a condition known as "loss of signal" (LOS). After OLT 242 receives a frame that includes a payload with a CID error, OLT 242 may remain in LOS until OLT 242 receives a valid upstream communication (e.g., a frame without a CID error in its payload). If a malicious user causes ONUs 246 to send two or more consecutive frames with payloads containing CID errors, OLT 242 may remain in LOS for an extended period of time.

As discussed, CID correctors 250 may prevent ONUs 246 from transmitting frames with payloads containing CID errors. More specifically, CID correctors 250 may ensure that OLT 242 receives sufficient bit transitions from ONUs 246 to avoid experiencing LOS. In examples where CID correctors 250 utilize a correction pattern that includes a run of alternating ones and zeros, CID correctors 250 ensure that OLT 242 receives the maximum possible number of bit transitions possible within the corrected portion of a frame's payload. In this manner, techniques of the present disclosure may reduce or eliminate the occurrence of LOS on OLT 242 caused by CID errors included in upstream bursts from ONUs 246.

Figure 3:
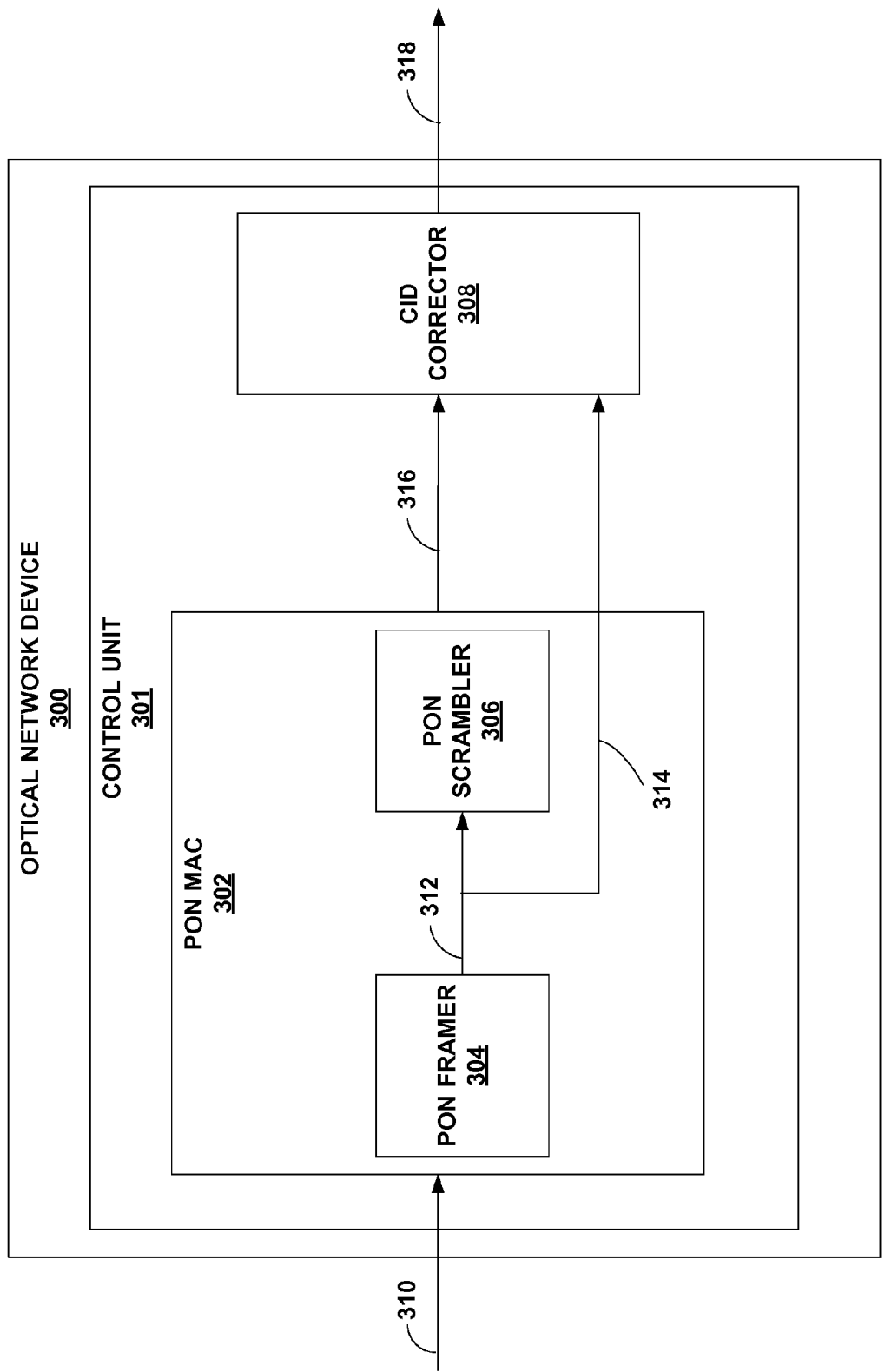
FIG. 3 is a block diagram illustrating details of an optical network device that implements CID error correction in accordance with one or more aspects of the techniques described in this disclosure.

FIG. 3 is a block diagram illustrating details of optical network device 300 that implements CID error correction, in accordance with one or more aspects of the present disclosure. Optical network device 300 includes a passive optical network media access controller (PON MAC) 302, and a CID corrector 308. PON MAC 302 further includes PON framer 304 and PON scrambler 306. Optical network device 300 may be one non-limiting example of OLT 102 or one of ONUs 116 illustrated in FIG. 1.

In the example of FIG. 3, optical network device 300 may include control unit 301. Control unit 301 may, for example, comprise any combination of one or more processors, one or more field programmable gate arrays (FPGAs), one or more application specific integrated circuits (ASICs), and one or more application specific standard products (ASSPs). Control unit 301 may also comprise memory, both static (e.g., hard drives or magnetic drives, optical drives, FLASH memory, EPROM, EEPROM, etc.) and dynamic (e.g., RAM, DRAM, SRAM, etc.), or any other non-transitory computer readable storage medium capable of storing instructions that cause the one or more processors to perform the efficient network management techniques described in this disclosure. Thus, control unit 301 may represent hardware or a combination of hardware and software to support the below described components, modules or elements, and the techniques should not be strictly limited to any particular embodiment described below.

As shown in FIG. 3, optical network device 300 may receive data in the form of data packets at PON MAC 302. PON MAC 302 may perform one or more steps to process a received data packet, such as packet 310. For example, PON MAC 302 may utilize PON framer 304 to encapsulate packet 310 to form PON frame 312. As described with respect to FIGS. 1-2, PON framer 304 may apply the generic encapsulation method (GEM) described in the current GPON standard to form PON frame 312. As discussed, since PON frame 312 is formed in accordance with GEM, PON frame 312 may include a 5-byte "GEM header" and a "payload" that includes data associated with packet 310.

The GEM header of PON frame 312 may include several types of data that describe the corresponding payload and/or encapsulated packet 310. As discussed, the GEM header of PON frame 312 may include data arranged in distinct fields, such as a payload length field, port-ID field, and a payload type indicator (PTI) field. Additionally, PON MAC 302 may extract data from PON frame 312 commonly known as "packet qualifiers." Packet qualifiers may indicate data associated with packet 310 relative to PON frame 312.

Examples of packet qualifiers extracted by PON MAC 302 may include a "start of packet" (SOP), "end of packet" (EOP), and number of "valid bytes" (VLD). As discussed, the payload of a PON frame is of variable length. For example, the length of the payload of PON frame 312 may vary based on attributes (such as length) of packet 310 that was encapsulated to form PON frame 312. Also, the position of the payload may vary from one PON frame to another. As discussed, in accordance with the GPON standard, PON framer 304 may place the payload at any one of 512 positions within PON frame 312. Moreover, when forming multiple frames, PON framer 304 exhausts all 512 possible positions before repeating a position.

As a payload may be placed in varying positions within PON frame 312 and the payload is not of fixed length, PON MAC 302 may extract the packet qualifiers from PON frame 312 in order to delineate the payload from the GEM header. More specifically, PON MAC 302 may extract the start of packet ("SOP") qualifier to reflect a bit of the GEM header that immediately precedes the payload. Similarly, PON MAC 302 may extract the end of packet ("EOP") qualifier to reflect a bit of the GEM header that immediately follows the payload. In this manner, PON MAC 302 may utilize the SOP and EOP packet qualifiers to indicate the precise starting point and ending point of a payload of a PON frame. Similarly, PON framer 304 may include a valid bytes ("VLD") qualifier in a GEM header to indicate the number of bytes included in the corresponding payload. In this manner, PON MAC 302 may utilize packet qualifiers to indicate, within a GEM header, the precise length and position of the GEM header's corresponding payload. PON framer 304 may then send PON frame 312 to PON scrambler 306. Aspects of GEM headers in accordance with the present disclosure are discussed in more detail with respect to FIG. 5 below.

PON scrambler 306 receives PON frame 312 from PON framer 304. PON scrambler 306 may be one non-limiting example of scrambler 106 illustrated in FIG. 1. As discussed with respect to scrambler 106 of FIG. 1, PON scrambler 306 may scramble the payload of PON frame 312 in order to reduce the probability of the payload containing a CID error. PON scrambler 306 may apply, to the payload of PON frame 312, the following scrambling polynomial described in the GPON standard:

$$x^7+x^6+1$$

Consistent with section 8.1.2 of the current GPON standard, PON scrambler 306 may apply the described polynomial (hereinafter, the "scrambling polynomial") modulo two to the payload of PON frame 312. By applying the scrambling polynomial to the payload of PON frame 312, PON scrambler 306 attempts to reduce the occurrence of CID errors in the payload.

However, as discussed, a malicious user or program may generate a packet 410 to leverage vulnerabilities of PON scrambler 306 (due to implementing this widely published scrambling polynomial) so as to cause PON scrambler 306 to output PON frame 312 with a payload containing a CID error, as described above. To protect the PON from these CID errors, optical network device 300 utilizes CID corrector 308. PON MAC 302 may copy or extract packet qualifiers 314 from PON frame 312, and send packet qualifiers 314 to CID corrector 308. Also, PON scrambler 306 sends scrambled PON frame 316 to CID corrector 308. CID corrector 308 may then inspect scrambled PON frame 316 for CID errors.

CID corrector 308 may inspect scrambled PON frame 316 by a two-step process. First, CID corrector 308 may use packet qualifiers 314 to identify the payload of scrambled PON frame 316. In some examples, CID corrector 308 may match an SOP of packet qualifiers 314 to an SOP included in the GEM header of scrambled PON frame 316. In one such example, CID corrector 308 may match an EOP of packet qualifiers 314 to an EOP included in the GEM header of scrambled PON frame 316. By matching the SOP and EOP of packet qualifiers 314 to the SOP and EOP of scrambled PON frame 316, CID corrector 308 may identify the precise starting and ending points of the payload within scrambled PON frame 316. In another example, CID corrector 308 may match an SOP and VLD of packet qualifiers 314 to an SOP and VLD of scrambled PON frame 316. In this manner, CID corrector 308 may identify the starting point of the payload of scrambled PON frame 316, and identify the remainder of the payload by measuring out the number of bytes specified in the VLD of packet qualifiers 314. In still another example, CID corrector 308 may use the EOP and VLD of packet qualifiers 314 to identify the payload.

Next, CID corrector 308 may inspect the identified payload of scrambled PON frame 316 for the presence of CID errors. As discussed, the GPON standard defines an acceptable CID length of 72. In other words, an optical network device conforming to the GPON standard may experience a CID error if the optical network device receives a frame that includes a payload with a run of 73 or more consecutive identical digits (i.e. either consecutive ones or consecutive zeros). In accordance with the current GPON standard, CID corrector 308 may inspect the payload of scrambled PON frame 316 for any runs of 73 or more consecutive identical digits.

Based on the result of inspecting the payload of scrambled PON frame 316, CID corrector 308 may perform a variety of steps. If CID corrector 308 determines that the payload of scrambled PON frame 316 is free of CID errors, CID corrector 308 may recognize scrambled PON frame 316 as an "error-free" PON frame. CID corrector 308 may then transmit PON frame 318 (either upstream or downstream, depending on the nature of optical network device 300).

If CID corrector 308 determines that the payload of scrambled PON frame 316 includes a CID error, CID corrector 308 may perform steps to correct the CID error. More specifically, CID corrector 308 may replace a portion of the payload with a "correction pattern." In one example, CID corrector 308 may replace just the portion of the payload that includes the CID error. In another example, CID corrector 308 may replace the portion of the payload that includes the CID error and the remainder of the payload immediately following the CID error. In still another example, CID corrector 308 may replace the entire payload with the correction pattern.

CID corrector 308 may select one of a variety of correction patterns with which to replace a portion of the payload of scrambled PON frame 316. An example of a correction pattern may be a run of alternating ones and zeros. In an example where CID corrector 308 replaces the entire payload with the correction pattern, the run of alternating ones and zeros may provide robust protection against loss of synchronous timing from CID errors. In this example, CID corrector 308 may transmit a corrected scrambled PON frame, i.e. PON frame 318, containing alternating ones and zeros throughout the entirety of its payload. As a result, an optical network device that receives PON frame 318 may read a bit transition at every bit of the payload. In this case, CID corrector 308 minimizes the risk of optical network devices on the PON losing synchronous timing owing to CID errors.

In addition to detecting and correcting CID errors, CID corrector 308 may "flag" PON frame 318 before transmission over the PON. In some examples, CID corrector 308 may flag PON frame 318 by inserting a proprietary character in a predetermined bit of the GEM header of PON frame 318. For example, CID corrector 308 may insert a "clean" character in a bit of the GEM header of PON frame 318 to indicate that CID corrector 308 did not detect any CID error in the payload of scrambled PON frame 316. In another example, CID corrector 308 may insert a "corrected" character in a bit of the GEM header of PON frame 318 to indicate that CID corrector 308 detected a CID error in scrambled PON frame 316 and replaced a portion of the payload of scrambled PON frame 316 with a correction pattern.

In some examples where CID corrector 308 has replaced a portion of the payload of scrambled PON frame 316 to form PON frame 318, CID corrector 308 may also insert an "error type indicator" character in a bit of the GEM header of PON frame 318. For example, CID corrector 308 may insert a "ones" character to denote that the payload of received scrambled PON frame 316 contained a CID error comprising a run of consecutive ones exceeding the threshold length of 72. Conversely, CID corrector 308 may insert a "zeros" character to denote that the payload of scrambled PON frame 316 contained a CID error comprising a run of consecutive zeros exceeding the threshold length of 72.

Figure 4B:
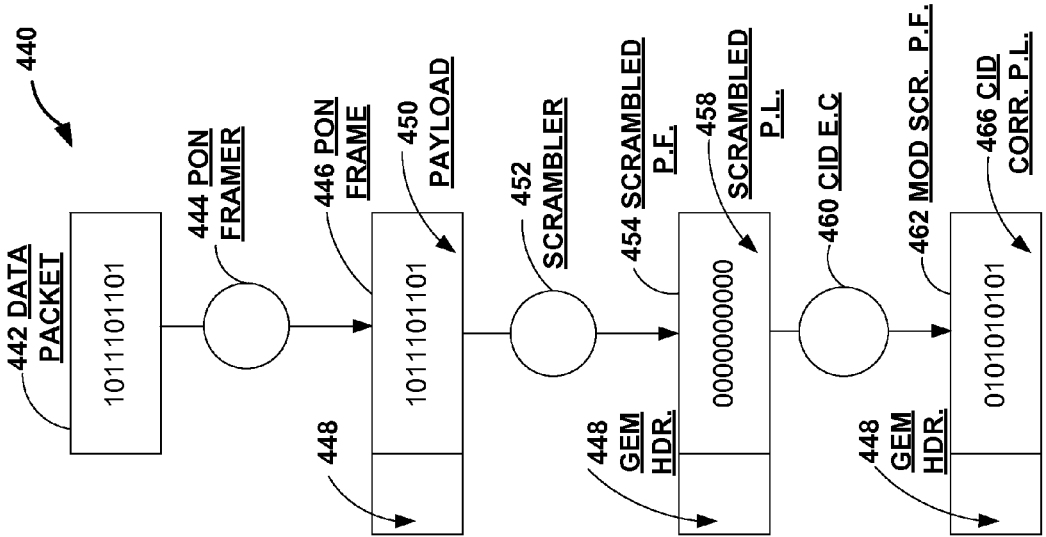
FIGS. 4A & 4B are flow diagrams illustrating encapsulation and scrambling of a packet, with and without CID error correction, respectively, in accordance with one or more aspects of the techniques described in this disclosure.
Figure 4A:
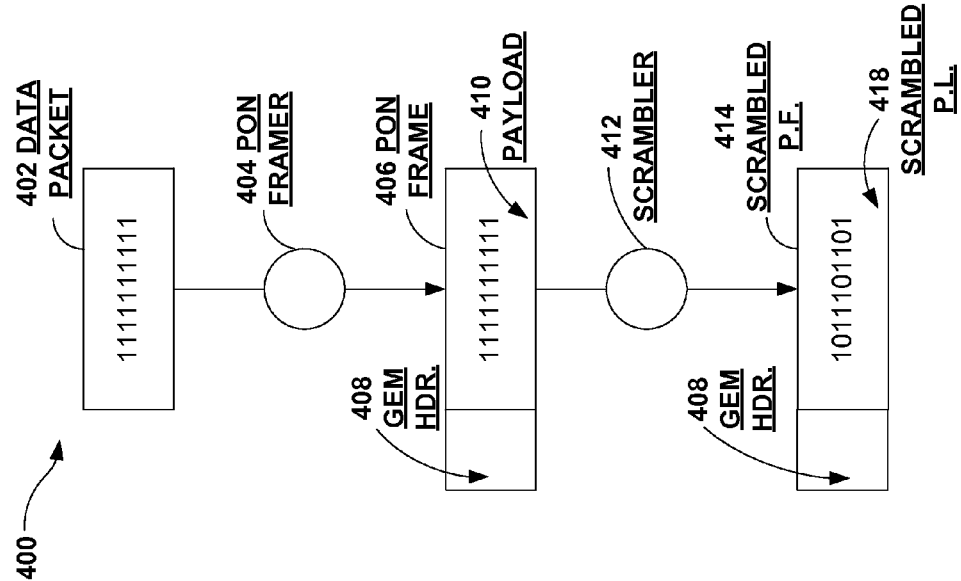

FIGS. 4A & 4B are flow diagrams illustrating encapsulation and scrambling of a packet, with and without CID error correction, respectively, in accordance with one or more aspects of the present disclosure. FIGS. 4A & 4B illustrate process 400 and process 440 respectively. In operation, one or more of the optical network devices illustrated in FIGS. 1-3 may perform processes 400 and 440.

FIG. 4A illustrates a process 400 by which data packet 402 is encapsulated by PON framer 404 to form PON frame 406. PON frame 406 further includes GEM header 408 and payload 410. Process 400 then includes scrambling payload 410 by scrambler 412, forming scrambled PON frame 414. As shown in FIG. 4A, scrambled PON frame includes GEM header 408 and scrambled payload 418.

In the example of FIG. 4A, the exemplary scrambling polynomial specified in the GPON standard is sufficient to correct a CID error in a received packet before transmission. To illustrate, Data packet 402 shown in the example of FIG. 4A is assumed to include a 10-digit run of consecutive ones, i.e., CID over a length of 10 digits. For purposes of illustration only, Data packet 402 may be considered to include a CID error, instead of the 73-digit CID described in the current GPON standard. PON framer 404 encapsulates Data packet 402 to form PON frame 406. PON frame 406 includes payload 410, which in this example is identical to Data packet 402. In the example of FIG. 4A, PON frame 406 includes the entirety of GEM header 408 in a position that precedes payload 410. In other examples, a portion of GEM header 408 may precede payload 410, and a remaining portion of GEM header 408 may follow payload 410. In still other examples, the entirety of GEM header 408 may follow payload 410. As discussed, PON framer 404 may place payload 410 in one of 512 positions within PON frame 406. As a result, PON framer 404 may have several options in terms of positioning portions of GEM header 408 in relation to payload 410.

Next, scrambler 412 may scramble payload 410 to form scrambled PON frame 414. For example, scrambler 412 may apply the scrambling polynomial described in the current GPON standard. Scrambled PON frame 414 includes GEM header 408 and scrambled payload 418. As shown in the example of FIG. 4A, scrambled payload 410 includes a 10-digit run that reads as follows:

1011101101

As illustrated, scrambled payload 410 does not include a CID error (which, for purposes of FIG. 4A, is run of 10 or more consecutive ones or consecutive zeros). The longest run of CID in scrambled payload 410 is 3 digits long.

In this manner, FIG. 4A illustrates an example in which the scrambling polynomial described in the current GPON standard successfully corrects a CID error caused by a received data packet. More specifically, Data packet 402 includes a CID error, as described with respect to this discussion of FIG. 4A. PON framer 404 encapsulates Data packet 402 to form PON frame 406. Since Data packet 402 includes a CID error, payload 410 of PON frame 406 includes a CID error. Scrambler 412 scrambles payload 410 (e.g., by applying the scrambling polynomial described in the current GPON standard) to form scrambled PON frame 414. Scrambled PON frame 414 includes scrambled payload 418 which is free of CID error.

FIG. 4B illustrates a process 440 in which data packet 442 causes a CID error when modified by the scrambling polynomial described in the current GPON standard. Process 440 further illustrates CID error corrector 460 detecting and correcting a CID error in scrambled payload 458. Data packet 442 may either cause a naturally occurring CID error when passed through scrambler 452, or may be a malicious packet that is designed to exploit vulnerabilities of the published and well-known scrambling polynomial. For purposes of illustration only, data packet 442 will be referred to as "malicious packet 442."

Process 440 may begin when an optical network device (e.g., optical network device 300 of FIG. 3) receives malicious packet 442. PON framer 444 of the optical network device may encapsulate malicious packet 442 to form PON frame 446. In the example of FIG. 2B, PON frame 446 includes GEM header 448 and payload 450. In this example, payload 450 is identical to malicious packet 442. As shown in FIG. 2B, PON frame 446 may not cause a CID error, as payload 450 includes a maximum CID run of 3 digits. In accordance with the current GPON standard, scrambler 452 applies the scrambling polynomial to payload 450 to form scrambled payload 458 of scrambled PON frame 454.

As shown in FIG. 2B, scrambled payload 458 includes a CID error. More specifically, scrambled payload 458 includes a CID run that is 10 digits long. In this example, malicious packet 442 has leveraged vulnerabilities of the published scrambling polynomial, causing scrambler 452 to form scrambled PON frame 454 such that scrambled payload 458 includes a CID error. More specifically, scrambled payload 458 includes a CID run that is 10 digits long.

Next, CID error corrector 460 may inspect scrambled PON frame 454 for CID errors, and may replace any detected CID errors with a correction pattern. In the example of FIG. 2B, CID error corrector 460 detects a CID error including 10 consecutive zeros in scrambled payload 458 of scrambled PON frame 454. CID error corrector 460 may then replace at least a portion of scrambled payload 458 with a correction pattern. In some examples, CID error corrector 460 may replace the entirety of scrambled payload 458 with a correction pattern. In other examples, CID error corrector 460 may replace only those portions of scrambled payload 458 that include a CID error. In these and still other examples, CID error corrector 460 may replace a remainder of scrambled payload 458 that follows the CID error. By replacing scrambled payload 458 with a correction pattern, CID error corrector 460 may form modified scrambled PON frame 462 that includes CID-corrected payload 466.

CID error corrector 460 may replace scrambled payload 458 with one of a variety of correction patterns. CID error corrector 460 may use any correction pattern that may enable a downstream ONU to maintain synchronous timing, or prevent an upstream OLT from experiencing LOS, as the case may be. In the specific example of FIG. 2B, CID error corrector 460 replaces scrambled payload 458 with a correction pattern that includes alternating ones and zeros. By using the correction pattern illustrated in FIG. 2B, CID error corrector 460 may ensure that a downstream ONU or an upstream OLT receives the maximum possible number of bit transitions over the replaced portion of modified scrambled payload 466.

FIGS. 4A & 4B illustrate one or more potential advantages of the techniques described in the present disclosure. FIG. 4A illustrates an example wherein scrambler 412 may successfully protect a network, such as a GPON, from CID errors by using the scrambling polynomial described in the current GPON standard. FIG. 4B illustrates an example wherein malicious packet 442 may exploit vulnerabilities of the published and well-known scrambling polynomial described in the current GPON standard. As illustrated in FIG. 4B, malicious packet 442 may cause scrambler 452 to output scrambled PON frame 454 with scrambled payload 458 that includes a CID error. CID error corrector 460 inspects scrambled payload 458 and detects the CID error. CID error corrector 460 then replaces the portion of scrambled payload 458 that contains the CID error with a correction pattern. The correction pattern includes sufficient bit transitions for a downstream ONU or upstream OLT, as the case may be, to avoid losing synchronous timing or experience LOS, respectively. In this manner, techniques described in the present disclosure may protect an optical network, such as a GPON, from malicious packets that leverage the currently published scrambling polynomial to cause CID errors.

Figure 5:
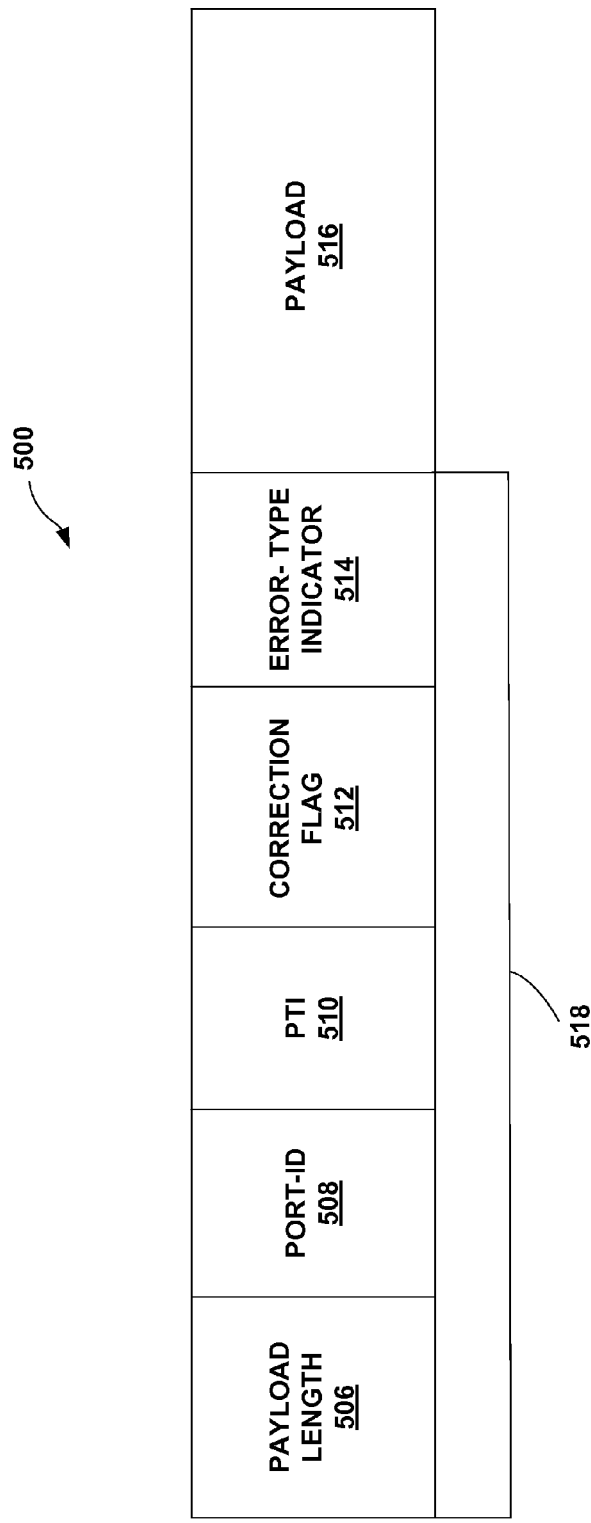
FIG. 5 is a block diagram illustrating an example structure of a PON frame in accordance with one or more aspects of the techniques described in this disclosure.

FIG. 5 is a block diagram illustrating an example structure of a PON frame in accordance with one or more aspects of the techniques described in this disclosure. CID-corrected PON frame 500 of FIG. 5 is only one example and, as discussed, numerous structures and arrangements are possible in accordance with aspects of this disclosure. While all optical network devices described in this disclosure are capable of forming CID-corrected PON frame 500, for purposes of ease of illustration, PON frame 500 will be described with respect to optical network device 300 of FIG. 3.

CID-corrected PON frame 500 may be one non-limiting example of PON frame 318 formed by CID corrector 308. As illustrated in FIG. 5, CID-corrected PON frame 500 includes GEM header 518 and payload 516. GEM header 518 includes a "valid bytes" (VLD) field, which indicates the length, in bytes, of payload 516. GEM header 518 also includes several fields, such as payload length 506, port-ID 508, and "payload type indicator" (PTI) 510. Port-ID 508, for example, is described in the current GPON standard as having a 12-bit length, and enables a receiving device (e.g., a downstream ONU) to multiplex PON frame 500 before forwarding a data packet over a customer network. Similarly, PTI 510 may include data that describes payload 516, and payload length 506 may indicate the length of payload 516.

In the example of CID-corrected PON frame 500, GEM header 518 also includes correction flag 512 and error-type indicator 514 in accordance with the techniques described in this disclosure. In various examples, one or both of correction flag 512 and error-type indicator 514 may be included in PTI 510. CID corrector 308 may detect and correct a CID error (namely, a run of 73 or more consecutive ones or zeros) by replacing a portion of payload 516 with a correction pattern (e.g. a run of alternating ones and zeros). In addition to the detection and correction, CID corrector 308 may "flag" CID-corrected PON frame 500, in order to indicate to a receiving device that payload 516 was modified to overcome a CID error. To flag CID-corrected PON frame 500, CID corrector 308 may modify GEM header 518 to include correction flag 512. In some examples, correction flag 512 may be one bit in length. In cases where payload 516 includes a correction pattern, CID corrector 308 may cause correction flag 512 to include a "corrected" bit. In this manner, CID corrector 308 may assist a device receiving CID-corrected PON frame 500 to identify CID-corrected PON frame 500 as having been formed from a data packet that caused the current GPON scrambling polynomial to output a CID error. The receiving device may then take a variety of actions, accordingly (e.g., forwarding a packet including the correction pattern over a customer network, etc.).

In some examples where CID corrector 308 modified payload 516 to overcome CID error, CID corrector 308 may also cause GEM header 518 to include error-type indicator 514. In some examples, correction flag 512 may be one bit in length. Error-type indicator 514 may assist a device that receives CID-corrected PON frame 500 to gain a comprehensive understanding of the CID error caused by packet 310. For example, error-type indicator 514 may indicate whether the corrected CID error was caused by consecutive ones or consecutive zeros. Using the information of error-type indicator 514, the receiving device may be able to discern with more accuracy the nature of packet 310 that caused a CID error. In combination with correction 512, error-type indicator 514 may enable a device that receives CID-corrected PON frame 500 to quickly identify that a CID error was corrected, and pinpoint the nature of the CID error.

In other examples, GEM header 518 may include an error-length indicator. The error-length indicator may occupy a bit of PTI 510. The error length indicator may indicate that a secondary header of PON frame 500 (not shown for ease of illustration purposes) includes further data related to the length of the CID error. The data in the secondary header may include the precise length of the CID error, instead of merely the implied threshold length of 72. In examples, the data may include information such as a starting bit and an ending bit of the CID error, and information related to the correction pattern applied. In combination with error-type indicator 514, the error-length indicator and supporting data in the secondary header may enable a device receiving CID-corrected PON frame 500 to fully reconstruct packet 310 for further study. In this manner, techniques of this disclosure may enable CID error detection and correction on a transmitting device, and may also enable deconstruction of the CID error on a receiving device.

Figure 6:
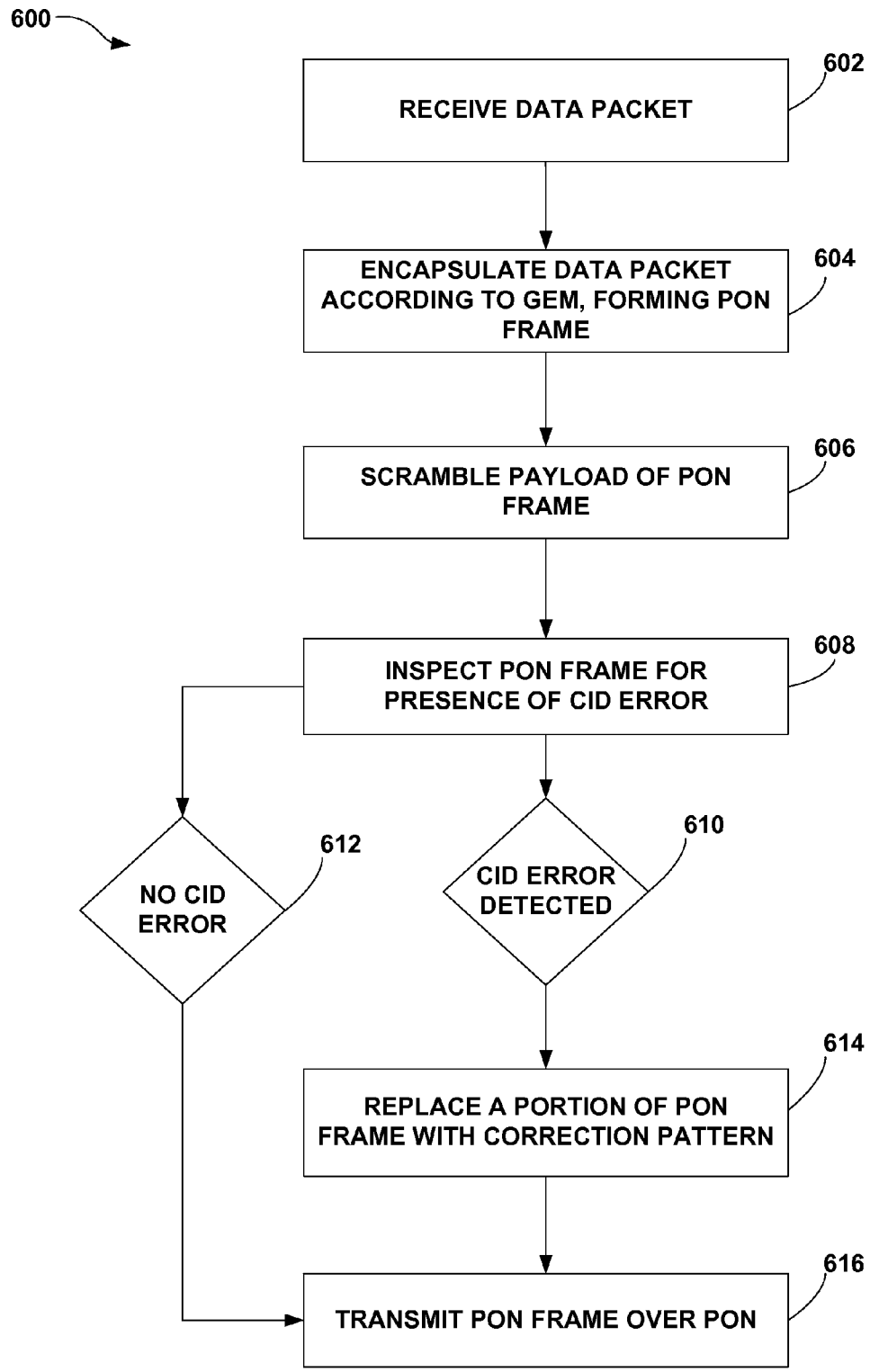
FIG. 6 is a flowchart illustrating a process by which an optical network device performs CID error detection and correction, in accordance with one or more aspects of the techniques described in this disclosure.

FIG. 6 is a flowchart illustrating a process by which an optical network device performs CID error detection and correction, in accordance with one or more aspects of the techniques described in this disclosure. While process 600 may be performed by any optical network device described herein, for ease of illustration purposes only, process 600 will be described with respect to optical network device 300 of FIG. 3 in the context network system 100 of FIG. 1 and CID-corrected PON frame 500.

Optical network device may receive a data packet (e.g., packet 310) via network (602). For example, where optical network device 300 is an optical line terminal, such as OLT 102, optical network device 300 may receive packet 310 from service provider network 120. Similarly, where optical network device 300 is an optical network unit, such as ONU 116A, optical network device 300 may receive packet 310 from customer network 118A.

Next, PON framer 304 of optical network device 300 may encapsulate packet 310 in accordance with the generic encapsulation method (GEM) described in the current GPON standard, to form PON frame 312 (604). As discussed, PON frame 312 may include a GEM header and a payload. The payload may include data associated with packet 310. In some examples, the payload of PON frame 312 may be an exact replica of packet 310.

PON scrambler 306 of optical network device 300 may then scramble the payload of PON frame 312 to form scrambled PON frame 316 (606). PON scrambler 306 may scramble the payload by applying the scrambling polynomial described in the current GPON standard modulo two to the payload. By scrambling the payload of PON frame 312 to form scrambled PON frame 316, PON scrambler 306 may reduce the probability of CID error occurring over network system 100. However, the scrambling polynomial does not completely eliminate the occurrence of CID error, and certain packets can still cause a CID error when scrambled in this manner. Moreover, since the scrambling polynomial is described in the current GPON standard, a public and well-disseminated document, a hacker or malicious program may leverage the weaknesses of the scrambling polynomial to cause CID errors on network system 100.

CID corrector 308 of optical network device 300 may then inspect scrambled PON frame 316 for CID errors (608). More specifically, CID corrector 308 may inspect the payload of scrambled PON frame 316 for any occurrence of consecutive ones or zeros that exceed a pre-programmed threshold length. Per the current GPON standard, the threshold length is described as 72. Depending on whether or not CID corrector 308 detects a CID error in the payload of scrambled PON frame 316, CID corrector 308 may perform a variety of steps.

If CID corrector 308 detects a CID error (610), CID corrector 308 may then modify scrambled PON frame 316 to form CID-corrected PON frame 500. CID corrector 308 may modify scrambled PON frame 316 by replacing a portion of scrambled PON frame 316 (e.g., its payload) with a correction pattern (614). In addition, CID corrector 308 may add correction flag 512 and/or error-type indicator 514 to GEM header 518 of CID-corrected PON frame 500. As discussed, payload 516 may include a correction pattern, such as a sequence of alternating ones and zeros. Since payload 516 has been corrected for CID error, CID-corrected PON frame 500 may be recognized as one example of PON frame 318.

If CID corrector 308 does not detect a CID error in the payload of scrambled PON frame 316 (612), then CID corrector 308 may recognize scrambled PON frame 316 as an example of PON frame 318.

After decision block 612 or step 614, as the case may be, optical network device 300 may transmit PON frame 318 over the PON of network system 100. Where optical network device 300 is an example of OLT 102, optical network device 300 may transmit PON frame 318 as part of downstream traffic to ONUs 118. Conversely, where optical network device 300 is an example of ONU 116A, optical network device 300 may transmit error-free PON frame 318 as part of an upstream burst to OLT 102.

Figure 7:
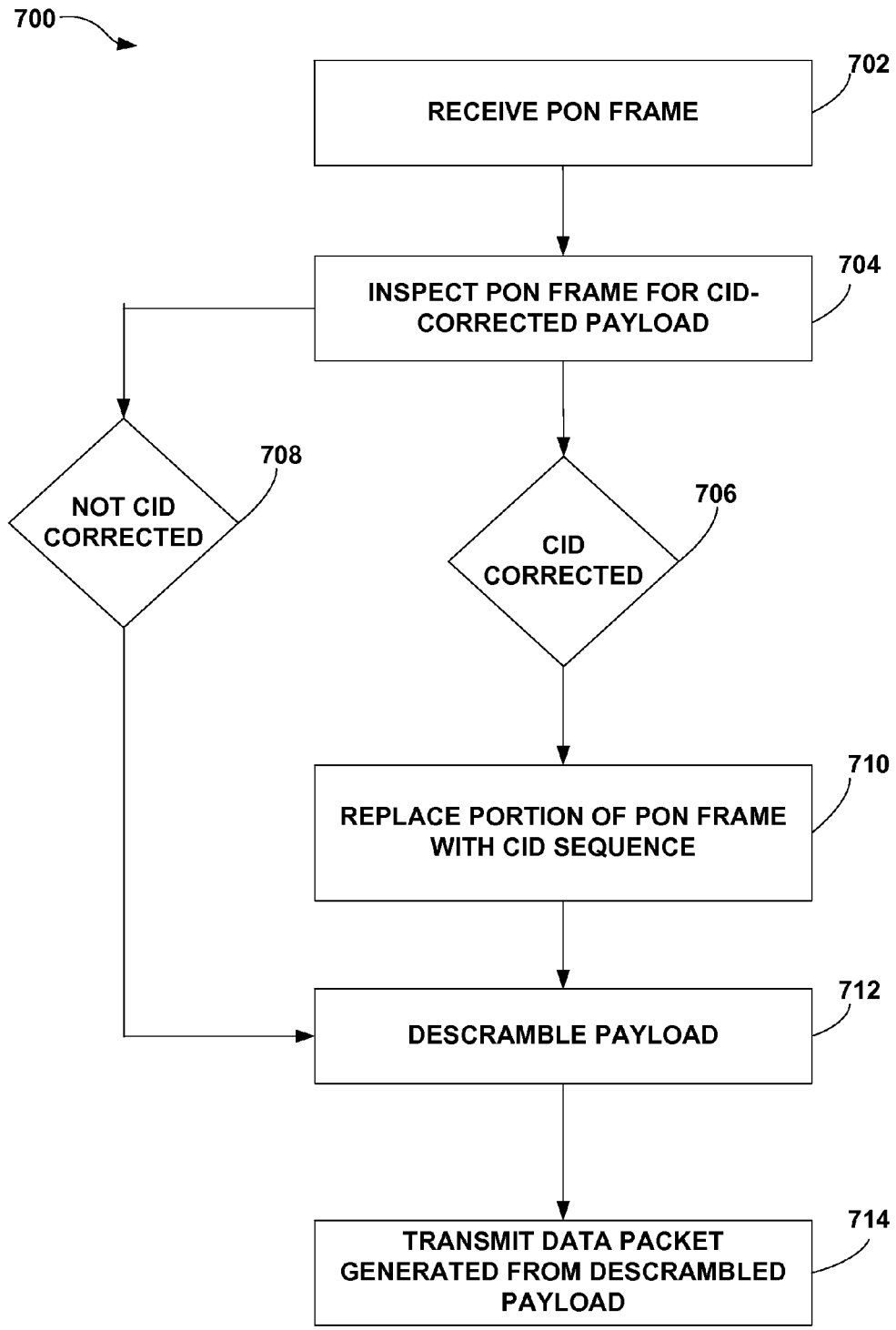
FIG. 7 is a flowchart illustrating an example process by which an optical network device deconstructs and descrambles a received PON frame that was corrected for CID error, in accordance with one or more aspects of the techniques described in this disclosure.

FIG. 7 is a flowchart illustrating an example process by which an optical network device deconstructs and descrambles a received PON frame that was corrected for CID error, in accordance with one or more aspects of the techniques described in this disclosure. While process 700 may be performed by any of the optical network devices described herein, process 700 is described with respect to ONUs 210 of FIG. 2 in the context of network system 100 of FIG. 1 and CID-corrected PON frame 500 of FIG. 5.

ONUs 210 may receive PON frame 216 over network system 100 (702). PON MACs 212 may inspect PON frame 216 for a CID-corrected payload (704). To inspect PON frame 500 for a CID-corrected payload, PON MACs 212 may check the GEM header of PON frame 216 for the presence of a correction flag. If PON frame 216 includes a correction flag, such as correction flag 512 of CID-corrected PON frame 500, PON MACs 212 may determine that PON frame 216 includes a CID-corrected payload, i.e. that the payload of PON frame 216 includes a correction pattern (706).

Based on determining that PON frame 216 includes a CID-corrected payload, CID correctors 218 may replace a portion of PON frame 216 with a CID sequence (710). For example, CID correctors 218 may construct a CID sequence based on error-type indicator 514. More specifically, CID correctors 218 may construct a CID sequence of consecutive ones or consecutive zeros, based on the digit indicated by error-type indicator 514. By replacing a portion of the payload with the CID sequence, CID correctors 218 may reconstruct PON frame 216 in its pre-corrected form.

If PON MACs 212 determine that PON frame 216 was not corrected for CID error (e.g., by the absence of correction flag 512 in the GEM header) (708), CID correctors 218 may bypass step 710 (i.e. replacing a portion of PON frame 216 with a CID sequence). PON MACs 212 may then descramble the payload of the reconstructed PON frame. More specifically, PON MACs 212 may derive an inverse function of the scrambling polynomial applied by the transmitting optical network device. In instances where CID correctors 218 replaced the payload with a CID sequence, PON MACs 212 may generate a payload mirroring the packet that caused the scrambling polynomial to output a CID error. ONUs 216 may then transmit a data packet based on the descrambled payload (e.g. to customer networks 118).

FIGS. 8-13 illustrate alternative implementations and techniques that are possible in accordance with aspects of this disclosure. In general, FIGS. 8-13 illustrate examples by which an optical network device may determine whether a received data packet would likely result in a CID error after the data packet is encapsulated according to GEM and scrambled as per the current GPON standard. An optical network device may also implement aspects of the alternative techniques to modify such a data packet to reduce the chances of a CID error after encapsulation and scrambling. In some instances, an optical network device may also implement a CID failsafe after encapsulation and scrambling. A CID failsafe in accordance with this disclosure may function similarly to certain aspects described above, such as CID corrector 308 of FIG. 3.

Figure 8:
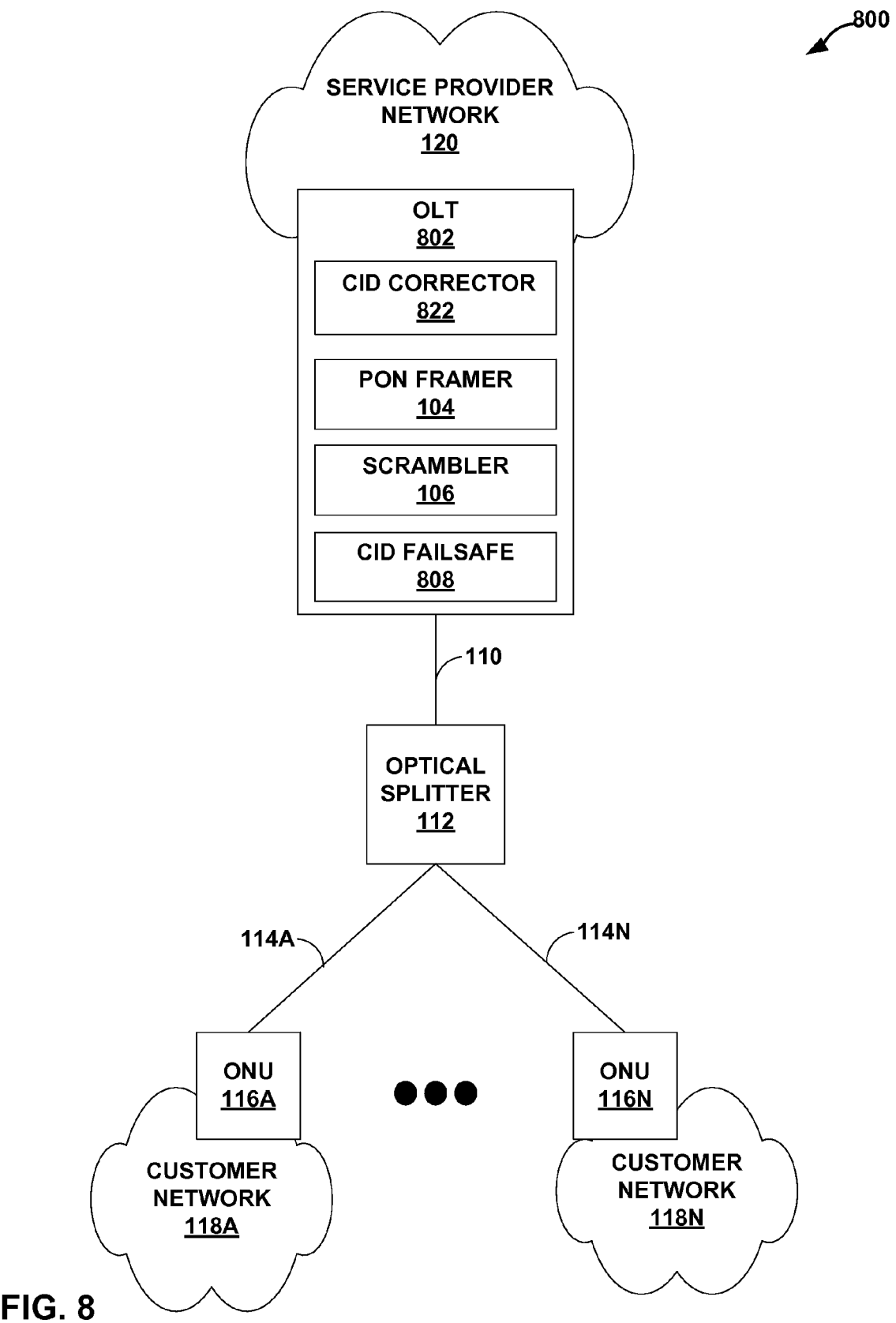
FIG. 8 is a block diagram illustrating an example network system including an optical line terminal ("OLT") that implements consecutive identical digit ("CID") correction in accordance with one or more aspects of the techniques described in this disclosure.

FIG. 8 is a block diagram illustrating a network system 800 including an optical line terminal ("OLT") 802 that implements consecutive identical digit ("CID") correction in accordance with one or more aspects of the techniques described in this disclosure. Similarly to network system 100 described with respect to FIG. 1, network system 800 may conform to any of a variety of optical network standards that utilize bit transitions to synchronize timing, such as broadband PON (BPON) (ITU G.983), gigabit-capable PON (GPON) (ITU G.984), XGPON or 10G-PON (ITU 987), gigabit Ethernet PON (GEPON) (IEEE 802.3), active optical network (AON) (IEEE 802.3ah), and the like. For purposes of illustration only, network system 800 is assumed to represent a system that conforms to the GPON standard. While described with respect to a particular type of system, i.e., one that conforms to the GPON standard, the techniques may be implemented by any network system that utilize bit transition to facilitate or preserve synchronous timing between two or more network elements.

Several elements of FIG. 8 are numbered similarly to corresponding elements of FIG. 1. Commonly numbered elements of FIGS. 1 & 8 may operate similarly. For ease of discussion, only those elements with different element numbers from FIG. 1 are described with respect to FIG. 8.

OLT 802 may, in many respects, operate in a manner similar to that described above with respect to OLT 102. However, as shown in FIG. 8, OLT 802 includes CID corrector 822 and CID failsafe 808, in contrast to CID error corrector 108 of OLT 102. In some examples, CID corrector 822 may inspect an incoming data packet from service provider network 120 to determine whether the data packet is likely to result a CID error before being encapsulated by PON framer 104 and scrambled by scrambler 106. Additionally, CID corrector 822 may attempt to prevent the CID error, such as modifying the data packet before passing the data packet to PON framer 104 for encapsulation.

CID corrector 822 may determine that a data packet is likely to cause a CID error in a number of ways. Similarly, CID corrector 822 may correct the packet to reduce the chances of a CID error in a number of ways. A few example approaches that CID corrector 822 may utilize to detect a likely CID error-causing packet and corresponding correction approaches are described below.

In one example, CID corrector 822 may determine whether a PON frame whose payload contains the same contents as the data packet will cause a CID error after scrambler 106 applies the scrambling polynomial described in the current GPON standard. In other words, CID corrector 822 may receive a packet for delivery via the PON and attempt to determine, prior to framing and scrambling by respective PON framer 104 and scrambler 106, whether the resulting packet, when subsequently framed and scrambled, will result in a CID error. As discussed, PON framer 104 may place the data packet in one of 512 possible positions within the resulting PON frame. Consequently, scrambler 106 may apply the scrambling polynomial to the data packet to simulate as many of the 512 possible outcomes as possible. To cover as many scenarios as possible, CID corrector 822 may implement the techniques described in this disclosure to apply the scrambling polynomial of the current GPON standard to the data packet a total of 512 times, each time using a different one of the 512 seeds for the scrambling polynomial.

In another example, CID corrector 822 may process the data packet on a byte-by-byte basis in an attempt to determine whether the packet will result in a CID error once framed and scrambled. In this example, CID corrector 822 may apply the scrambling polynomial of the current GPON standard to each byte of the data packet. In different implementations of this approach, CID corrector 822 may determine at different junctures that the data packet is likely to cause a CID error. As noted at various points of this disclosure, the current GPON standard defines a CID error as a run of CID that exceeds 72 bits (i.e., 9 bytes). However, in some implementations of a byte-by-byte based determination, CID corrector 822 may identify the data packet as likely to cause a CID error before CID corrector 822 generates 9 bytes of CID. For example, in one implementation, CID corrector 822 may determine that the data packet is likely to cause a CID error after 5 consecutive bytes result in CID. In this example, CID corrector 822 may identify a 5-byte run of CID as a tendency toward a CID error.

In still another example, CID corrector 822 may determine that the data packet is likely to cause a CID error based on the length of the data packet. As discussed, the current GPON standard defines a CID error as a run of consecutive identical digits that exceeds a length of 72 bits (or 9 bytes). In this example, CID corrector 822 may determine that the data packet is likely to cause a CID error if the data packet exceeds 72 bits in length.

Based on determining that the data packet is likely to cause a CID error once framed (or encapsulated) and scrambled, CID corrector 822 may take a variety of measures to modify the data packet in an attempt to prevent a CID error before OLT 802 transmits the resulting scrambled PON frame to optical splitter 112. For example, if CID corrector 822 determines that the data packet is likely to cause a CID error using any of the exemplary CID error detection techniques described above, CID corrector 822 may rescramble the scrambled packet by applying a secondary scrambler. Because the current GPON standard does not define a secondary scrambling function, CID corrector 822 may formulate a secondary scrambling function that may not be generally published and available to the public. For example, CID corrector 822 may rescramble the scrambled packet by applying an exclusive or ("XOR") function to the scrambled packet and a correction operand. In one example, the correction operand may be a run of alternating ones and zeros. In other examples, the correction operand may be any sequence that converts a CID sequence to a sequence that includes bit transitions at intervals that do not exceed the threshold for causing a CID error, e.g., a length of 72 bits in the GPON standard.

In an example where CID corrector 822 determines that the data packet is likely to cause a CID error, CID corrector 822 may also rescramble the scrambled packet, but with an operation other than XOR. For example, CID corrector 822 may randomize the order of the bits in the data packet. To randomize the bits of the data packet, CID corrector 822 may use a seed value that is proprietary to network system 800 (and thus, not known to an external malicious user). For example, CID corrector 822 may draw the seed value from a PON frame timer or frame counter of OLT 802. In this manner, CID corrector 822 may rescramble the scrambled data packet in such a way that only other devices connected directly to the PON have access to information that enables descrambling. Malicious users typically do not directly connect to a PON, but connect to the PON via another device, such as one of ONUs 116 or OLT 802, and thus typically cannot access this information.

In another example where CID corrector 822 determines that the data packet is likely to cause a CID error, CID corrector 822 may fragment (or cause "forced fragmentation" of) the data packet, forming multiple sub-packets. In some implementations, CID corrector 822 may fragment the data packet in such a way that none of the resulting sub-packets exceeds a length of 72 bits. CID corrector 822 may then pass the sub-packets to PON framer 104, and PON framer 104 may then encapsulate the sub-packets according to GEM. When encapsulating multiple data packets (or, in this case, sub-packets), PON framer 104 may insert header information within the PON frame's payload to demarcate data corresponding to each data packet. The header information may provide the bit transition necessary to prevent loss of timing over network system 800. In this particular implementation, because each sub-packet has a length of 72 bits or less, the resulting PON frame may include a header-provided bit transition at or within the 72-bit threshold defined in the current GPON standard. In this manner, CID corrector 822 may implement forced fragmentation to ensure that PON framer 104 always adds a header-provided bit transition at or within the 72-bit threshold defined in the current GPON standard.

While particular detection techniques have been described with respect to particular correction techniques for ease of discussion, different combinations are possible in accordance with one or more aspects of the present disclosure. For example, CID corrector 822 may detect a possible CID error causing data packet using byte-by-byte based determination, and then apply the XOR-based rescrambler to correct the data packet. Moreover, two or more CID detection techniques may be employed to detect a CID error, where different CID detection techniques may be used in conjunction with one another or different CID detection techniques may be employed in different circumstances (e.g., under high load conditions the byte-checking approach may be used, while under low-load conditions, all 512 scrambling seeds may be checked). Thus, the techniques may be implemented with respect to thresholds for applying the different CID detection techniques, where the thresholds may be adapted based on various criteria, such as processor load, current bandwidth or any other metric commonly employed for switching application of different tasks.

In the example of FIG. 8, OLT 802 also includes CID failsafe 808. CID failsafe 808 may execute functions substantially similar to those of CID error corrector 108 described with respect to FIG. 1. For example, CID failsafe 808 may inspect the scrambled PON frame generated by PON framer 104 and scrambler 106 for a CID run that exceeds the 72-bit threshold defined in the current GPON standard. If CID failsafe 808 detects a CID error in the scrambled PON frame, CID failsafe 808 may replace a portion of the scrambled PON frame with a correction pattern.

CID failsafe 808 may function as a backup option to CID corrector 822, which implements CID error detection and correction functions on data packets before the data packets are encapsulated according to GEM. In various other implementations of the techniques described in this disclosure, an optical network device (e.g., OLT 802) may not include CID failsafe 808. Instead, such an optical network device may rely solely on CID error detection and correction at a pre-encapsulation stage, such as the functionalities provided by CID corrector 822.

By employing CID corrector 822 at a pre-encapsulation stage, the techniques may enable OLT 802 to detect CID errors at an early stage, and thereby spend fewer resources to correct the CID errors. For example, by employing CID corrector 822 at the pre-encapsulation stage, OLT 802 may conserve the computing resources needed to descramble and/or unframe a PON frame before correcting a detected CID error. Similarly, OLT 802 may conserve the computing resources needed to reframe and/or rescramble a modified PON frame. In this manner, OLT 802 may employ CID corrector 822 at a pre-encapsulation stage to more efficiently detect and correct CID errors before transmitting traffic downstream to ONUs 116.

Figure 9B:
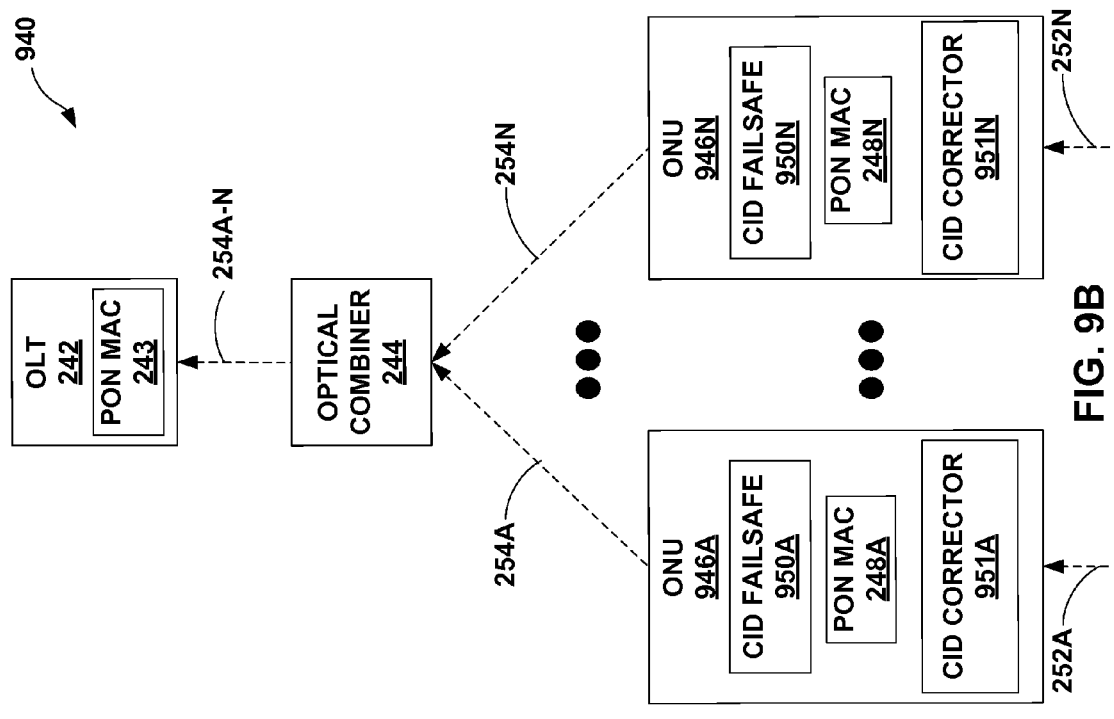
FIGS. 9A & 9B are block diagrams illustrating examples of downstream traffic from an optical line terminal ("OLT") and upstream bursts from one or more optical network units ("ONUs") of respective network systems in accordance with one or more aspects of the present disclosure.
Figure 9A:
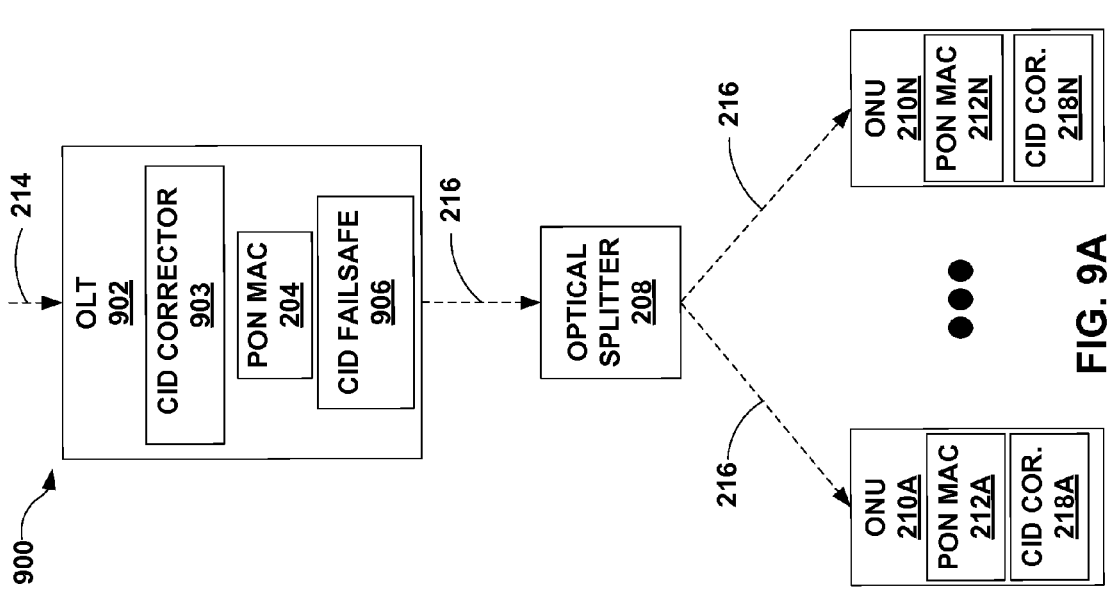

FIGS. 9A & 9B are block diagrams illustrating downstream traffic from an optical line terminal ("OLT") and upstream bursts from one or more optical network units ("ONUs") of respective network systems 200 and 240 in accordance with one or more aspects of the present disclosure. Several elements of FIGS. 9A & 9B are numbered similarly to corresponding elements of FIGS. 2A & 2B, respectively. Commonly numbered elements may operate similarly. For ease of discussion, only those elements with different element numbers from FIGS. 2A & 2B are described with respect to FIGS. 9A & 9B.

FIG. 9A illustrates downstream traffic in an example network system 900. In accordance with the current GPON standard and the operation of PONs in general, downstream transmission over network system 900 may be continuous. The downstream transmission may include downstream traffic (e.g., including PON frame 216) and timing signals which provide bit transitions to maintain synchronous timing between OLT 902 and ONUs 210. As shown in FIG. 9A, OLT 902 includes CID corrector 903 and CID failsafe 906. CID corrector 903 may be one non-limiting example of CID corrector 822 described with respect to FIG. 8. In the example of FIG. 9A, CID corrector 903 may determine whether packet 214 is likely to cause a CID error after PON MAC 204 encapsulates and scrambles packet 214 according to the current GPON standard. Additionally, CID corrector 903 may modify packet 214 before passing packet 214 to PON MAC 204, in an attempt to prevent the occurrence of a CID error in frame 216. CID corrector 903 may perform the CID error detection and correction in one or more of the several ways described above with respect to the example of FIG. 8.

In some implementations, OLT 902 may also include CID failsafe 906. CID failsafe 906 may provide a second layer of CID error detection and correction after CID corrector 903. As opposed to CID corrector 903, which inspects and modifies pre-encapsulation stage data (e.g., packet 214 before it is encapsulated to form a PON frame), CID failsafe 906 may inspect and modify encapsulated data (more specifically, a scrambled PON frame). If CID failsafe 906 detects a CID error (i.e., a CID run exceeding 72 bits in length), CID failsafe 906 may modify the PON frame to include a bit transition sufficient to prevent a loss of synchronous timing over network system 900.

In one example, CID failsafe 906 may begin the correction process by determining the length of the CID run that triggered a CID error. If the CID run exceeds the threshold by one byte or less, CID failsafe 906 may replace the last byte of the CID run with a correction pattern. By replacing a single byte of the PON frame, CID failsafe 906 may limit the modification of the PON frame to a single data packet included in the payload. In this manner, CID failsafe 906 may minimize the amount of processing required by ONUs 210 to reconstruct packet 214.

ONUs 210 may process frame 216 similarly to as described with respect to FIG. 2A. In those examples described above where CID corrector 903 forced fragmentation of packet 214 before encapsulation and scrambling, PON MACs 212 may reconstruct packet 214 by concatenating the sub-packets. In other examples, PON MACs 212 may forward the sub-packets as individual packets over the respective customer networks.

FIG. 9B illustrates upstream traffic in an example network system 940. Consistent with the GPON standard and with PONs in general, upstream traffic sent from ONUs 946 to OLT 242 may be viewed as a series of "upstream bursts." Similar to CID corrector 903 and CID failsafe 906 described with respect to FIG. 9A, CID correctors 951 and CID failsafes 946 may inspect and modify pre-encapsulation and post-encapsulation data for possible CID errors.

After OLT 242 receives frames 254, PON MAC 243 may apply one or more inverse scrambling functions to frames 254 in the process of reconstructing packets 252. In some instances where CID correctors 951 rescrambled packets 252 before encapsulation and scrambling, PON MAC 243 may apply two inverse scrambling functions to frames 254. First, PON MAC 243 may apply an inverse scrambler that reverses the effects of the secondary scrambler applied by CID correctors 951. As discussed, a secondary scrambler in accordance with this disclosure may be based on information that is known only to devices that directly connect to the GPON, such as an OLT and/or ONT. PON MAC 243 may derive the inverse scrambling function from this information. Next, PON MAC 243 may apply an inverse scrambling function that reverses the effects of the scrambling polynomial described in the current GPON standard. In this manner, OLT 242 may reconstruct packets 252 for forwarding over a service provider network by applying one or more inverse scrambling functions that are proprietary to network system 940.

Figure 10:
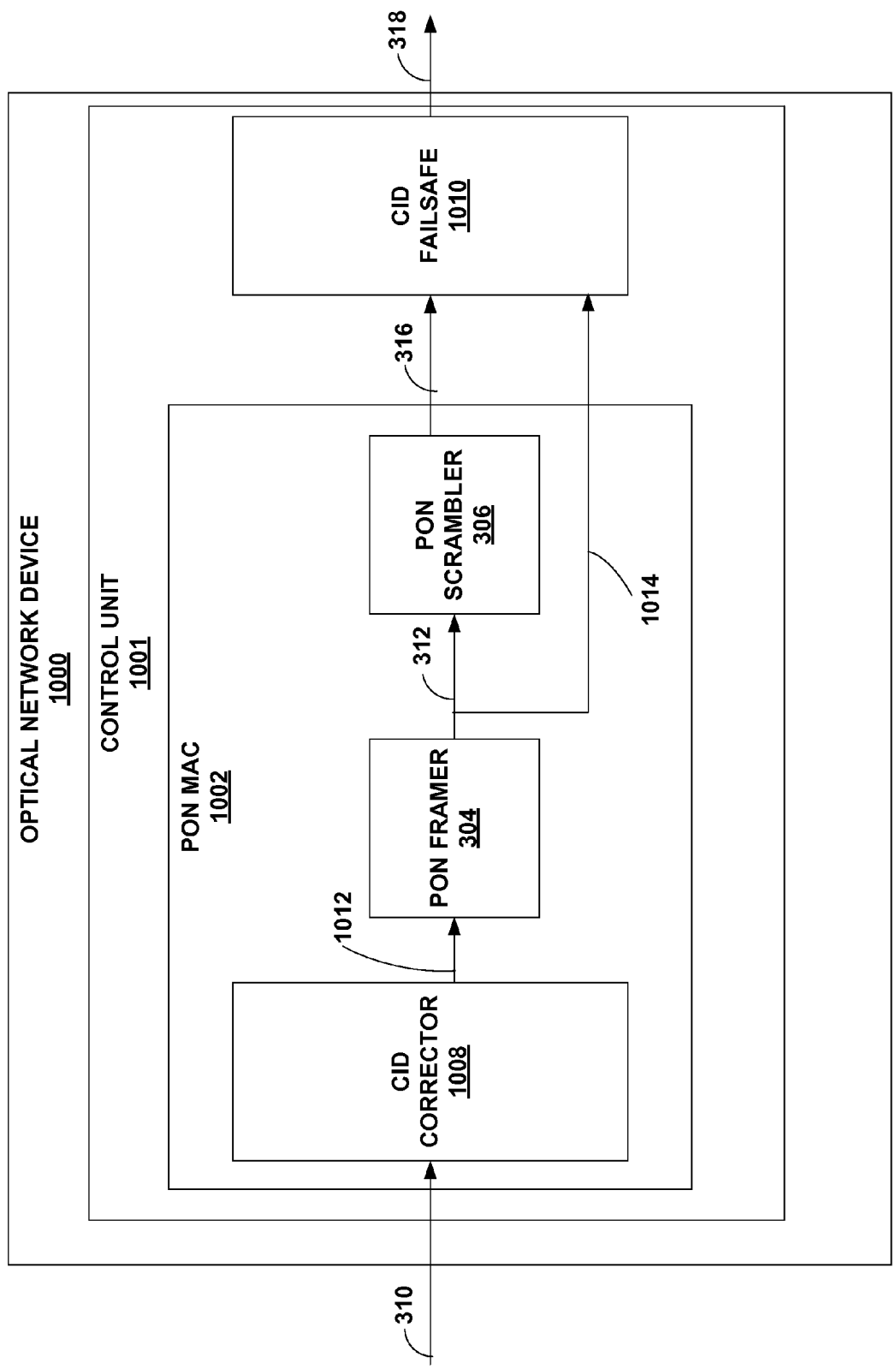
FIG. 10 is a block diagram illustrating details of an example optical network device that implements CID error correction, in accordance with one or more aspects of the present disclosure.
Figure 11:
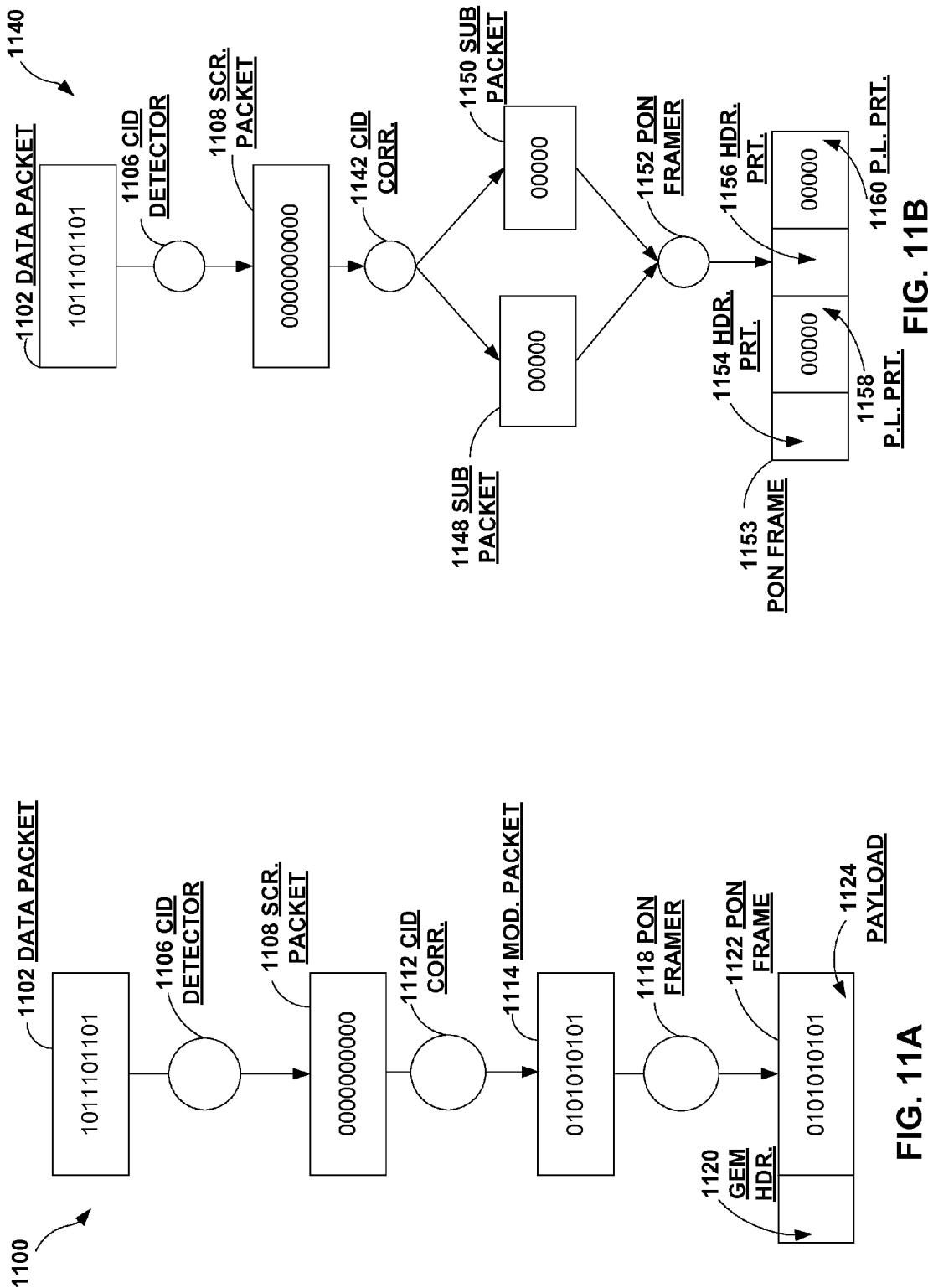
FIGS. 11A & 11B are flow diagrams illustrating examples of pre-encapsulation CID error detection and correction, in accordance with one or more aspects of the techniques described in this disclosure.

FIG. 10 is a block diagram illustrating details of optical network device 1000 that implements CID error correction, in accordance with one or more aspects of the present disclosure. Optical network device 1000 may be one example of one or more devices described herein, such as OLT 802 of FIG. 8 or ONU 946A of FIG. 9. Several elements of FIG. 10 are numbered similarly to corresponding elements of FIG. 3. Commonly numbered elements of FIGS. 3 & 8 may operate similarly. For ease of discussion, only those elements with different element numbers from FIG. 3 are described with respect to FIG. 10.

In the example of FIG. 10, optical network device 1000 may include control unit 1001. Control unit 1001 may, for example, comprise any combination of one or more processors, one or more field programmable gate arrays (FPGAs), one or more application specific integrated circuits (ASICs), and one or more application specific standard products (ASSPs). Control unit 1001 may also comprise memory, both static (e.g., hard drives or magnetic drives, optical drives, FLASH memory, EPROM, EEPROM, etc.) and dynamic (e.g., RAM, DRAM, SRAM, etc.), or any other non-transitory computer readable storage medium capable of storing instructions that cause the one or more processors to perform the efficient network management techniques described in this disclosure. Thus, control unit 1001 may represent hardware or a combination of hardware and software to support the below described components, modules or elements, and the techniques should not be strictly limited to any particular embodiment described below.

As shown in FIG. 10, PON MAC 1002 includes CID corrector 1008, which receives packet 310. CID corrector 1008 may implement one or more of the techniques of this disclosure described in detail above to determine whether packet 310 will cause a CID error after being encapsulated and scrambled by PON framer 304 and PON scrambler 306, respectively. CID corrector 1008 may, upon determining that packet 310 will cause a CID error, perform one or more of the CID correction techniques described in more detail above so as to generate a modified packet that will not cause a CID error. In the example of FIG. 10, CID corrector 1008 is included within PON MAC 1002. In other examples, CID corrector 1008 may be external to PON MAC 1002. Although shown in the example of FIG. 10 as being external to PON MAC 1002, in other examples, CID failsafe 1010 may be included within PON MAC 1002.

PON MAC 1002 may also copy or extract framing data 1014 from frame 312, and forward framing data 1014 to CID failsafe 1010. Framing data 1014 may include information described with respect to FIG. 3, including packet qualifiers such as SOP, EOP, and VLD that are associated with placement of packet 310 within frame 312. In addition to, or in lieu of one or more of the packet qualifiers, framing data 1014 may include information such as a "start of frame" (SOF), "end of frame" (EOF), PON frame overhead, frame count, and others.

SOF and EOF may be similar to packet qualifiers SOP and EOP in that they may indicate the starting and ending bits of frame 312, respectively. In an example where optical network device 1000 is an OLT, PON frame overhead may include, among other information, an ONU number that identifies a particular downstream ONU for which frame 312 is intended. In an example where optical network device 1000 is an ONU, frame count may indicate the place of frame 312 in a series of frames, such as a single upstream burst.

CID failsafe 1010 may utilize framing data 1014 to implement a second layer of CID error detection and correction. For example, if CID failsafe 1010 detects a CID error in scrambled PON frame 316, CID failsafe 1010 may use SOF and SOP information to discern where the header of scrambled PON frame 316 begins and ends. CID failsafe 1010 may then "unframe" packet 310 by removing the header information, leaving only the payload. To correct the CID error in the payload, CID failsafe 1010 may utilize any of a number of approaches. In one example, CID failsafe 1010 may replace a portion of the payload with a correction pattern (as discussed with respect to FIG. 3).

In another example, CID failsafe 1010 may add the header back to the payload, and then alter a parity bit of the header, causing PON frame 318 to have uneven bit parity. By creating uneven bit parity in PON frame 316, CID failsafe 1010 may cause any optical network device that receives PON frame 318 to discard PON frame 318. As a result, no optical network device that receives PON frame 318 will process PON frame 318. This correction approach may sometimes be referred to as "pitching" PON frame 318 or packet 310. By pitching PON frame 318, CID failsafe 1010 may prevent a receiving optical network device from losing synchronous timing owing to a CID error in PON frame 318. In the context of PONs, the loss of a single PON frame may be relatively insignificant when compared to a loss of synchronous time. Hence, the pitching approach to CID error correction may be a viable technique in maintaining synchronous timing over a PON. In this example, CID failsafe 1010 may cause PON framer 304 to update the bit-interleaved parity 8 (or "BIP8") calculation for a subsequent PON frame that follows PON frame 318. Because the BIP8 calculation for any PON frame is based on the preceding PON frame, and in this case, CID failsafe 1010 altered the parity bit of PON frame 318 to pitch PON frame 318, the BIP8 calculation for subsequent PON frames may need to be altered so that a receiving optical network device will not register a BIP8 error.

FIGS. 11A & 11B are flow diagrams illustrating pre-encapsulation CID error detection and correction, in accordance with one or more aspects of the techniques described in this disclosure. For ease of illustration purposes, as with FIGS. 4A & 4B, a CID error may be illustrated by a CID run that is 10 bits or longer. FIGS. 11A & 11B illustrate process 1100 and process 1140 respectively. In operation, one or more of the optical network devices illustrated in FIGS. 8-10 may perform processes 1100 and 1140.

FIG. 11A illustrates process 1100 by which CID detector 1106 inspects data packet 1102, prior to encapsulation and subsequent scrambling, to determine whether data packet 1102 will cause a CID error after being encapsulated and scrambled as described in the current GPON standard. Additionally, CID corrector 1112 may modify scrambled packet 1108 before encapsulation, in an effort to prevent a CID error on the PON. PON framer 1118 may then encapsulate modified packet 1114 according to GEM, forming PON frame 1122.

In the example of FIG. 11A, CID detector applies the scrambling polynomial specified in the current GPON standard. By applying the scrambling polynomial to data packet 1102, CID detector 1106 may determine whether data packet 1102 will cause a CID error after being encapsulated and scrambled by an optical network device. CID detector 1106 may apply the scrambling polynomial in a number of ways, including those described in more detail above with respect to the example of FIG. 8.

By applying the scrambling polynomial described in the current GPON standard to data packet 1102, CID detector 1106 may form scrambled packet 1108. As shown, scrambled packet 1108 includes a CID error, namely, a 10-bit long run of consecutive zeros. In this manner, CID detector 1106 may implement one or more techniques of the present disclosure to identify a possible CID error before PON framer 1118 encapsulates data packet 1102 in accordance with GEM.

In response to the determination that packet 1102 will cause a CID error, CID corrector 1112 may then modify scrambled packet 1108 to form modified packet 1114. As discussed in this disclosure, CID corrector 1112 may modify scrambled packet 1108 in any of the number of ways described above with respect to the example of FIG. 8. FIG. 11A illustrates an instance in which CID corrector 1112 replaces the contents of scrambled packet 1108 with a correction pattern. In this instance, CID corrector 1112 uses a correction pattern formed of alternating ones and zeros. As a result, the contents of modified packet 1114 may include as many bit transitions as possible.

PON framer 1118 may then encapsulate modified packet 1114 according to GEM, forming PON frame 1122. As discussed with respect to PON frames in general, PON frame 1122 includes a GEM header 1120, and payload 1124. As shown in FIG. 11A, payload 1124 is free of CID error, and in fact, includes the maximum possible number of bit transitions. An optical network device implementing process 1100 may transmit PON frame 1122 without risking a loss of synchronous timing, LOS, or other conditions associated with CID errors.

FIG. 11B illustrates process 1140, which may be an alternative approach to the pre-encapsulation CID detection and correction functions illustrated in FIG. 11A. FIG. 11B is also illustrated with respect to data packet 1102, described with respect to FIG. 11A. Additionally, process 1140 of FIG. 11B utilizes CID detector 1106, also described with respect to FIG. 11A. In another example, process 1140 may utilize a CID detector that identifies data packet 1102 as causing a CID error cause if data packet 1102 exceeds a threshold length.

In the example of FIG. 11B, CID corrector 1142 modifies scrambled packet 1106 by forced fragmentation. As shown, CID corrector 1142 fragments (or divides) scrambled packet 1106 into sub-packets 1148 and 1150. Each of sub-packets 1148 and 1150 includes CID. More specifically, both sub-packets 1148 and 1150 contain runs of consecutive zeros. However, neither of sub-packets 1148 and 1150 includes a CID run that is long enough to cause a CID error. In examples not shown in FIG. 11B for ease of illustration, CID corrector 1142 may fragment scrambled packet into more than two sub-packets, in order to keep the length of each sub-packet below the threshold length to cause a CID error. In this manner, CID corrector 1142 may use forced fragmentation to prevent a possible CID error by modifying the length of scrambled packet 1106, rather than the contents.

PON framer 1152 may then encapsulate both sub-packets 1148 and 1150 to form a single PON frame, such as PON frame 1153. The GEM header of PON frame 1153 may be distributed in at least two distinct regions, shown by header portions 1154 and 1156. PON frame 1153 may include header portions 1154 and 1156 in distinct regions in order to demarcate portions of the payload that are associated with different packets. In this example, the payload includes payload portions 1158 and 1160, which are associated with sub-packets 1148 and 1150, respectively. In the example of PON frame 1153, header portion 1156 may provide the bit transition necessary to prevent the CID error that would have occurred if payload portions 1158 and 1160 had been adjacent to one another.

Figure 12:
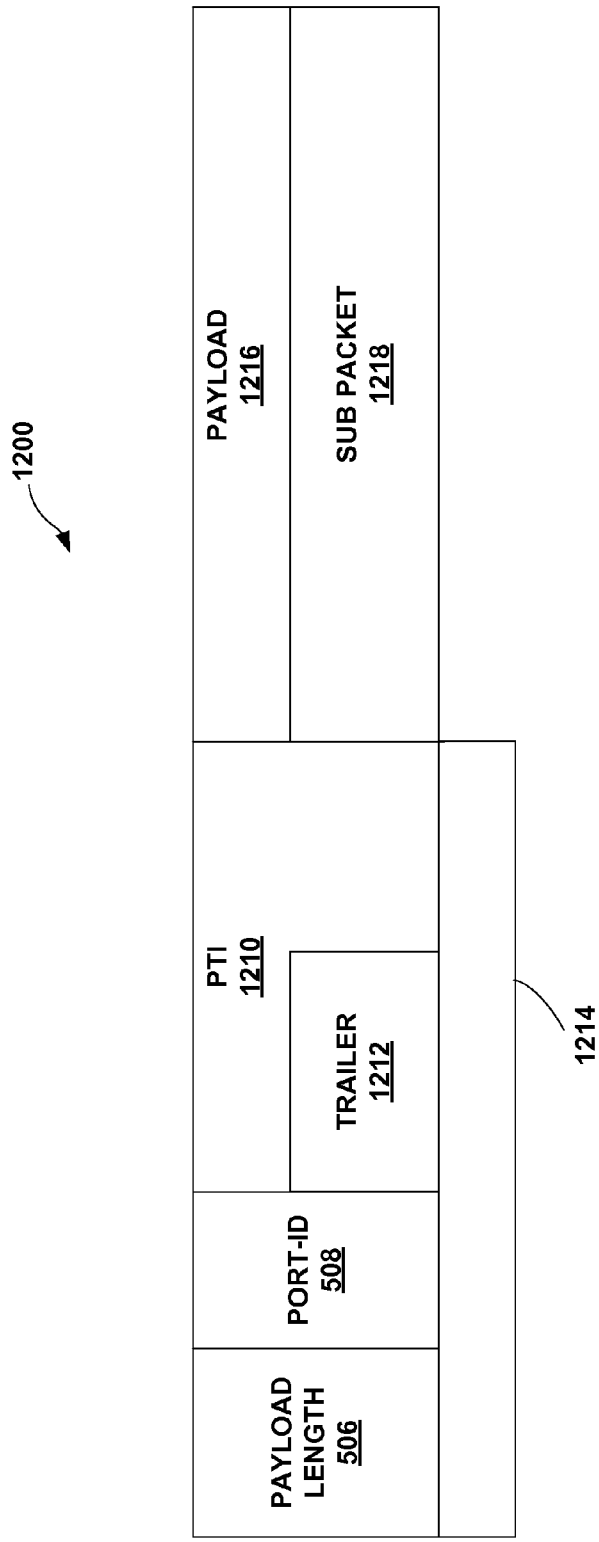
FIG. 12 is a block diagram illustrating an example structure of a PON frame in accordance with one or more aspects of the techniques described in this disclosure.

FIG. 12 is a block diagram illustrating an example structure of a PON frame in accordance with one or more aspects of the techniques described in this disclosure. CID-corrected PON frame 1200 is one structure of a PON frame that is possible according to the techniques of this disclosure. More specifically, CID-corrected PON frame 1200 includes payload 1216 that may be characteristic of CID correction by forced fragmentation, as described in the present disclosure. CID-corrected PON frame 1200 may be one non-limiting example of PON frame 1153 described with respect to FIG. 11B. Several elements of FIG. 12 are numbered similarly to corresponding elements of FIG. 5. Commonly numbered elements of FIGS. 5 & 12 may operate similarly. For ease of discussion, only those elements with different element numbers from FIG. 5 are described with respect to FIG. 12.

For ease of illustration purposes only, PON frame 1200 is shown to include a single GEM header 1214 and a single payload 1216. Each set may be known as a "GEM fragment." However, in various examples conforming with the current GPON standard, PON frame 1200 may include two or more sets of GEM header and payload. In these examples, the remaining GEM fragment(s) may be concatenated with PON frame 1200. For example, a second GEM header may begin at the end of payload 1216. A second payload may follow the second GEM header, and so on. As shown in FIG. 12, PTI field 1210 includes trailer 1212. Trailer 1212 may indicate whether or not a subsequent GEM fragment follows payload 1216.

As discussed, a CID corrector implementing the techniques of this disclosure may fragment a data packet to form multiple sub-packets, such as sub-packet 1218, such that the length of each of sub-packet 1218 and any subsequent sub-packets may be less than the threshold length required to cause a CID error. In a scenario where sub-packet 1218 and any subsequent sub-packet(s) may cause a CID error when concatenated, the header of the following GEM fragment may provide the bit transition(s) necessary to prevent the CID error. Thus, the contents of a packet from which sub-packet 1218 was generated may be preserved, and a CID error may be prevented by placing header information of a subsequent GEM fragment between sub-packet 1218 and any subsequent sub-packet(s) associated with sub-packet 1218. In this manner, techniques of this disclosure may prevent an optical network device that receives PON frame 1200 from experiencing a CID error, while preserving the data of a packet through forced fragmentation. The use of forced fragmentation according to the techniques of this disclosure is consistent with the current GPON standard.

Figure 13:
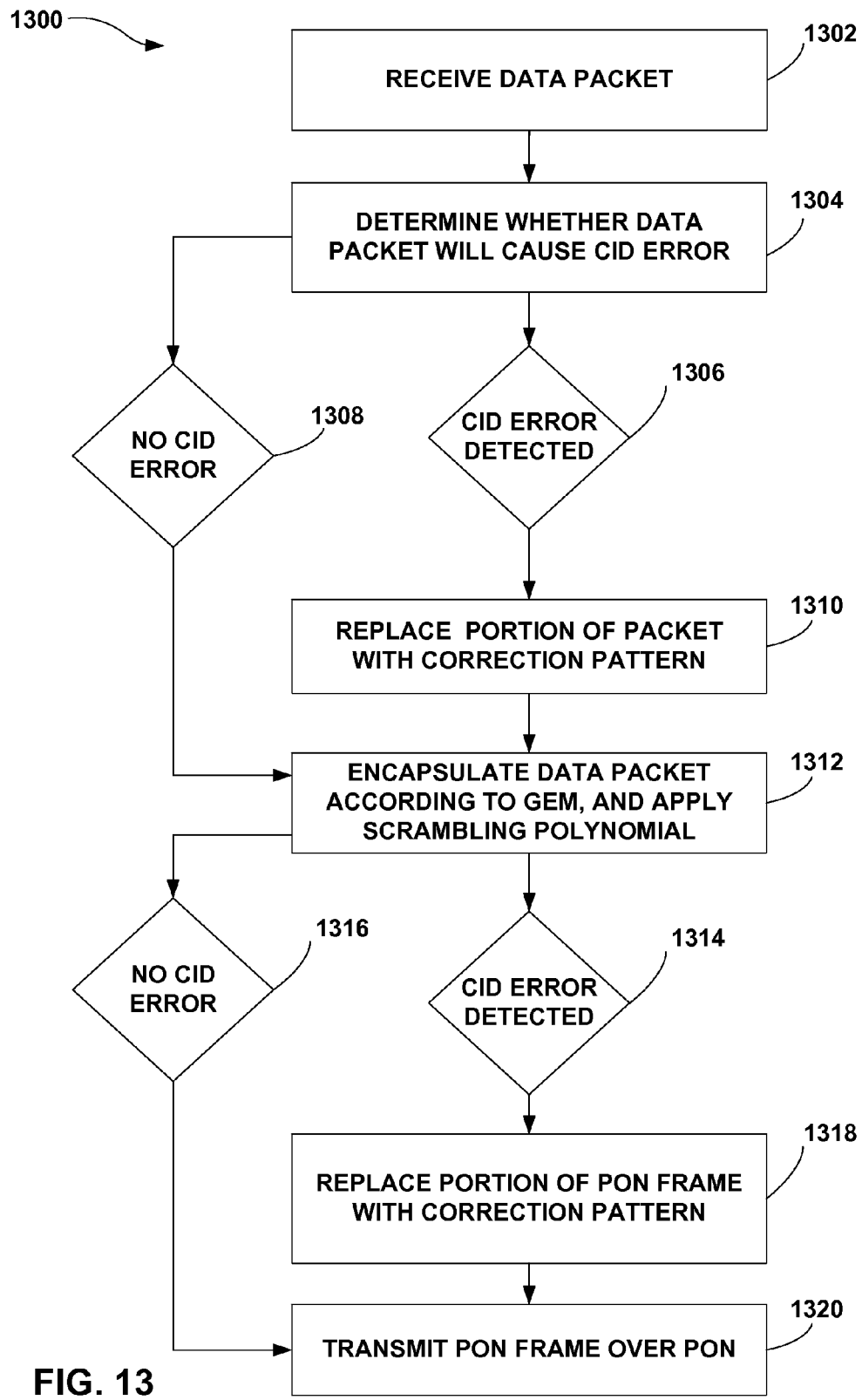
FIG. 13 is a flowchart illustrating an example process by which an optical network device performs CID error detection and correction at both the pre-encapsulation and post-encapsulation (and post-scrambling) stages in accordance with one or more aspects of the techniques described in this disclosure.

FIG. 13 is a flowchart illustrating a process 1300 by which an optical network device performs CID error detection and correction at both the pre-encapsulation and post-encapsulation (and post-scrambling) stages in accordance with one or more aspects of the techniques described in this disclosure. While process 1300 may be performed by several optical network devices (e.g., OLTs and/or ONTs) described in the present disclosure, for ease of illustration purposes only, process 1300 will be generally described with respect to optical network device 1000 of FIG. 10.

Optical network device 1000 may first receive a data packet, such as packet 310 (1302). Optical network device 1000, upon receiving packet 310, may invoke CID corrector 1008, which may determine whether packet 310 will cause a CID error according to one or more of the CID detection techniques described above (1304). To determine whether the packet will cause a CID error, CID corrector 1008 may apply a scrambling polynomial in accordance with one or more of the CID detection aspects of the techniques described above in the present disclosure. By applying the scrambling polynomial to packet 310 in one or more of these manners, CID corrector 1008 may attempt to detect, at a pre-encapsulation stage, whether packet 310 will cause a CID error after encapsulation and scrambling in accordance with the current GPON standard.

Assuming CID corrector 1008 detects a CID error for purposes of illustration (1306), CID corrector 1008 may modify the scrambled packet in one or more ways before sending the packet to PON framer 304 for encapsulation according to GEM. In the example of FIG. 13, CID corrector 1008 may replace a portion of packet 310 with a correction pattern (1310). The correction pattern may repeat to cover the length of packet 310, and, as discussed, may provide bit transitions to prevent a CID error when received as part of a PON frame by another optical network device.

Alternatively, assuming CID corrector 1008 determines that packet 310 will not result in a CID error (1308), CID corrector 1008 may determine that packet 310 is fit for encapsulation and scrambling by PON framer 304 and PON scrambler 306 respectively, without raising the risk of causing a CID error.

Next, whether CID corrector 1008 determines that packet 310 will cause a CID error or not, CID corrector 1008 may forward packet 310 (with or without modification by the correction pattern, as the case may be) to PON framer 304 for encapsulation according to GEM, and PON scrambler 306 may apply the scrambling polynomial of the current GPON standard to the PON frame (1312). Based on the CID error detection and corresponding modification effected by CID corrector 1008, PON scrambler 306 may, in many cases, generate scrambled PON frame 316 such that scrambled PON frame 316 not include a CID error.

However, optical network device 1000 may check for and remedy any vulnerabilities of CID corrector 1008. For example, PON scrambler 306 may send scrambled PON frame 316 to CID failsafe 1010 for a second layer of CID error detection and correction. CID failsafe 1010 may begin by inspecting scrambled PON frame 316 for the presence of a CID error. If CID failsafe 1010 detects a CID error (1314), CID failsafe 1010 may replace a portion of scrambled PON frame 316 with a correction pattern (1318). If CID failsafe 1010 does not detect a CID error in scrambled PON frame 316 (1316), CID failsafe 1010 may determine that scrambled PON frame 316 is fit for transmission as is. Optical network device 1000 may then transmit PON frame (with or without the correction pattern, as the case may be) over the PON (1320).

Figure 14:
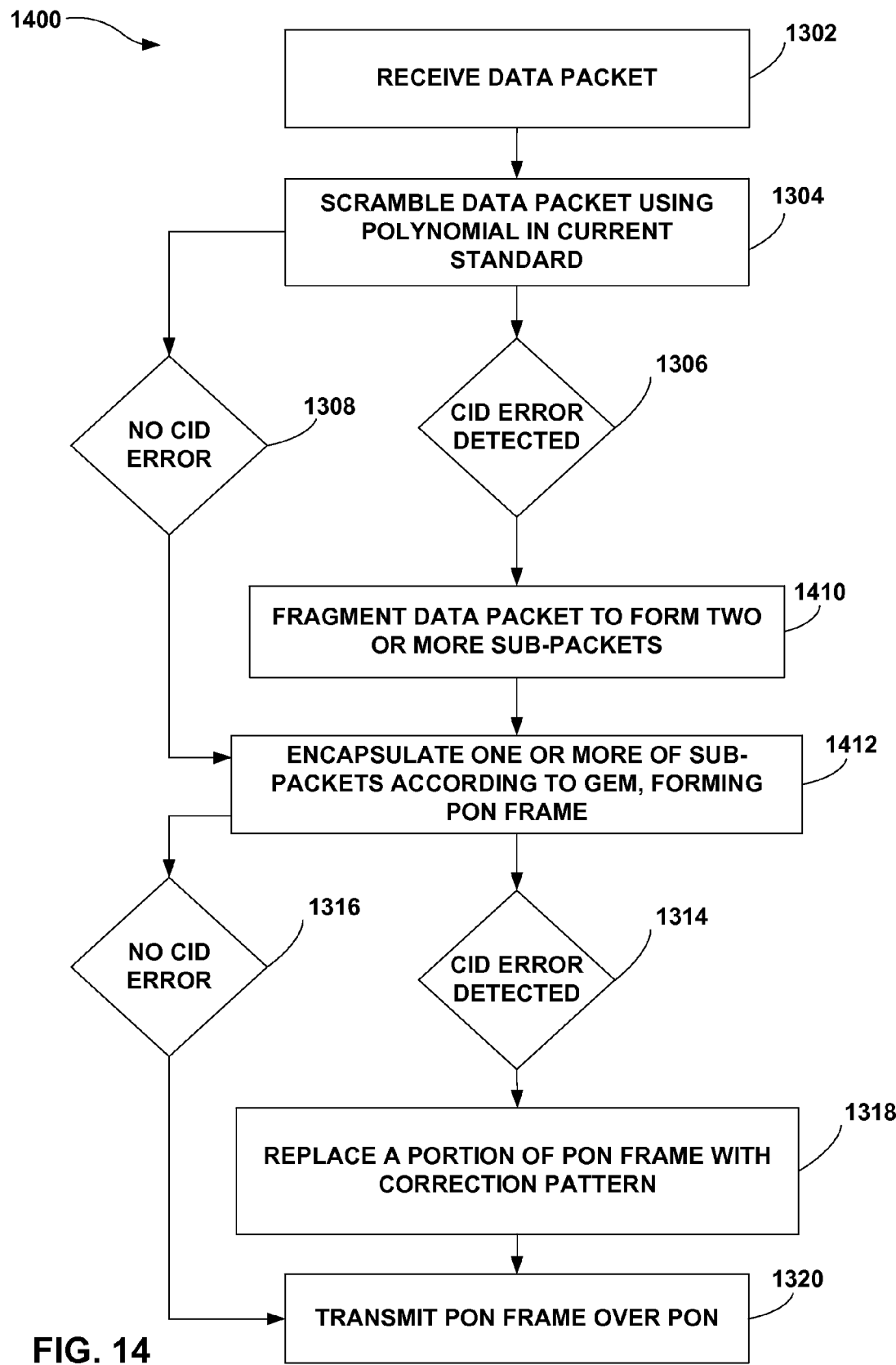
FIG. 14 is a flowchart illustrating a process by which an optical network device performs CID error detection and correction at both the pre-encapsulation and post-encapsulation stages, in accordance with one or more aspects of the techniques described in this disclosure.

FIG. 14 is a flowchart illustrating a process 1400 by which an optical network device performs CID error detection and correction at both the pre-encapsulation and post-encapsulation stages, in accordance with one or more aspects of the techniques described in this disclosure. Process 1400 of FIG. 14 may be an alternative, complementary, or supplementary implementation to process 1300 illustrated in FIG. 13. Several steps of process 1400 share common element numbers with steps of process 1300. For ease of discussion, only those steps with different element numbers from FIG. 13 are described with respect to FIG. 14. While process 1400 may be performed by several optical network devices described in the present disclosure, for ease of illustration purposes only, process 1400 will be described with respect to optical network device 1000 of FIG. 10.

In instances when CID corrector 1008 detects a CID error, CID corrector 1008 may perform forced fragmentation in the manner described above to prevent a CID error after packet 310 is encapsulated and scrambled. More specifically, CID corrector 1008 may fragment packet 310 to form two or more sub-packets (1410). CID corrector 1008 may fragment packet 310 in such a way that none of the resulting sub-packets is of sufficient length to cause a CID error. For example, conforming to the current GPON standard, CID corrector 1008 may fragment packet 310 so that each resulting sub-packet has a length of 72 bits or less. In some examples, CID corrector 1008 may set a lower limit, such as 65 bits, thus building in a buffer against possible CID error.

Next, CID corrector 1008 may forward some or all of the sub-packets to PON framer 304 for encapsulation according to GEM (1412). In accordance with GEM, PON framer 304 may interleave the payload of PON frame 312 with header information. PON framer 304 may place the header information between every two consecutive sub-packets. The header information may provide the bit transition(s) necessary to prevent a CID error, which would have otherwise occurred if the sub-packets had been directly adjacent to one another.

The techniques described in this disclosure may be implemented in hardware or any combination of hardware and software (including firmware). Any features described as units, modules, or components may be implemented together in an integrated logic device or separately as discrete but interoperable logic devices. If implemented in hardware, the techniques may be realized in a processor, a circuit, a collection of logic elements, or any other apparatus that performs the techniques described herein. If implemented in software, the techniques may be realized at least in part by a non-transitory computer-readable storage medium comprising instructions that, when executed in a processor, cause the processor to perform one or more of the methods described above. The non-transitory computer-readable medium may form part of a computer program product, which may include packaging materials. The non-transitory computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein, may refer to any of the foregoing structures or any other structure suitable for implementation of the techniques described herein. Likewise, the term "control unit," as used herein, may refer to any of the foregoing structures or any other structure suitable for implementation of the techniques described herein. In addition, in some aspects, the functionality described herein may be provided within dedicated software and hardware units configured to perform the techniques of this disclosure. Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various examples have been described. These and other examples are within the scope of the following claims.

What is claimed is:

1. A method comprising:
encapsulating, by an optical network device, at least a portion of a data packet to form a passive optical network (PON) frame;
applying, by the optical network device, a scrambling polynomial to at least a portion of the PON frame to generate a scrambled PON frame;
determining, by the optical network device, that the scrambled PON frame comprises a consecutive identical digit (CID) sequence greater than a threshold length;
based on the determination that the scrambled PON frame comprises the CID sequence greater than the threshold length, replacing, by the optical network device, either an entirety of a payload portion of the PON frame with a correction pattern or a remainder of the PON frame with the correction pattern to generate a modified scrambled PON frame, wherein the remainder of the PON frame begins at a bit that immediately follows the determined CID sequence and ends at a final bit of the payload portion;
based on the replacement with the correction pattern, modifying, by the optical network device, a header of the modified scrambled PON frame to include a correction flag that indicates the replacement with the correction pattern; and
transmitting, by the optical network device, the modified scrambled PON frame.

2. The method of claim 1, wherein applying the scrambling polynomial comprises applying the scrambling polynomial to at least the portion of the PON frame in accordance with a PON standard.

3. The method of claim 2, wherein applying the scrambling polynomial comprises applying the scrambling polynomial in accordance with the following scrambling polynomial defined in a gigabit capable PON (GPON) standard:

$$x^7+x^6+1$$

wherein x represents a bit of at least the portion of the PON frame.

4. The method of claim 1, wherein the correction pattern comprises a sequence of alternating ones and zeros.

5. The method of claim 1, further comprising modifying the header of the modified scrambled PON frame to include an error-type indicator that indicates a digit of the determined CID sequence, wherein modifying the header further comprises modifying a secondary header of the scrambled PON frame.

6. The method of claim 1, further comprising:
copying, by a passive optical network media access controller (PON MAC) of the optical network device, one or more packet qualifiers from the PON frame;
sending, by the PON MAC, the copied one or more packet qualifiers to a CID checker of the optical network device; and
verifying, by the CID checker, an identity of the PON frame by matching at least a portion of the PON frame to the copied one or more packet qualifiers.

7. The method of claim 6, further comprising obtaining, by the CID checker, the threshold length from one or processors communicatively coupled to the PON MAC and the CID checker.

8. The method of claim 1, wherein transmitting the modified scrambled PON frame comprises transmitting the modified scrambled PON frame in accordance with a gigabit-capable PON (GPON) standard.

9. The method of claim 1, wherein the optical network device comprises one of an optical line terminal (OLT) or an optical network unit (ONU).

10. An optical network device comprising:
a hardware control unit comprising:
a framer that encapsulates at least a portion of a data packet to form a passive optical network (PON) frame;
a scrambler that applies a scrambling polynomial to at least a portion of the PON frame to generate a scrambled PON frame;
a consecutive identical digit (CID) checker that:
determines that the scrambled PON frame comprises a CID sequence greater than a threshold length;
based on the determination that the scrambled PON frame comprises the CID sequence greater than the threshold length, replaces either an entirety of a payload portion of the PON frame with a correction pattern or a remainder of the PON frame with the correction pattern to generate a modified scrambled PON frame, wherein the remainder of the PON frame begins at a bit that immediately follows the determined CID sequence and ends at a final bit of the payload portion; and
based on the replacement with the correction pattern, modifies a header of the modified scrambled PON frame to include a correction flag that indicates the replacement with the correction pattern; and
a network interface that transmits the modified scrambled PON frame.

11. The optical network device of claim 10, further comprising:
a passive optical network media access controller (PON MAC), wherein the PON MAC includes the framer and the scrambler.

12. The optical network device of claim 10, wherein the CID checker further modifies the header of the modified scrambled PON frame to include an error-type indicator that indicates a digit of the determined CID sequence.

13. The optical network device of claim 10, wherein the network interface transmits the modified scrambled PON in accordance with a gigabit-capable passive optical network (GPON) standard.

14. The optical network device of claim 10, wherein the optical network device is an optical line terminal (OLT).

15. The optical network device of claim 10, wherein the optical network device is an optical network unit (ONU).

16. A non-transitory computer-readable medium comprising instructions for causing a hardware control unit to:
encapsulate at least a portion of a data packet to form a passive optical network (PON) frame;
apply a scrambling polynomial to at least a portion of the PON frame to generate a scrambled PON frame;
determine that the scrambled PON frame comprises a consecutive identical digit (CID) sequence greater than a threshold length;
based on the determination that the scrambled PON frame comprises the CID sequence greater than the threshold length, replace either an entirety of a payload portion of the PON frame with a correction pattern or a remainder of the PON frame with the correction pattern to generate a modified scrambled PON frame, wherein the remainder of the PON frame begins at a bit that immediately follows the determined CID sequence and ends at a final bit of the payload portion;

based on the replacement with the correction pattern, modify a header of the modified scrambled PON frame to include a correction flag that indicates the replacement with the correction pattern; and transmit the modified scrambled PON frame.

17. A method comprising:

receiving, by an optical network device, a modified scrambled passive optical network (PON) frame, the modified scrambled PON frame including a correction pattern in place of either a payload portion of a corresponding PON frame or a remainder of the corresponding PON frame, wherein the remainder of the corresponding PON frame begins at a bit that immediately follows a consecutive identical digit (CID) sequence and ends at a final bit of the payload portion of the corresponding PON frame;

determining, by the optical network device, that a payload of the modified scrambled PON frame includes the correction pattern, at least in part by reading a correction flag of a header of the modified scrambled PON frame, wherein the correction flag indicates that the payload includes the correction pattern;

based at least in part on reading the correction flag of the header of the modified scrambled PON frame, replacing, by the optical network device, the determined correction pattern with a CID sequence at either the payload of the modified scrambled PON frame or a remainder of the modified scrambled PON frame, to form a scrambled payload;

applying, by the optical network device, an inverse scrambling polynomial to the scrambled payload to form a descrambled payload; and transmitting, by the optical network device, a data packet that includes the descrambled payload.

18. The method of claim 17, wherein replacing the determined correction pattern further comprises:

reading an error-type indicator of a header of the modified scrambled PON frame, wherein the error-type indicator indicates a digit of the CID sequence; and forming the CID sequence based at least in part on the indicated digit.

19. The method of claim 18, further comprising reading an error-length indicator of the header of the modified scrambled PON frame, wherein the error-length indicator indicates a length of the CID sequence.

20. An optical network device comprising:

a hardware control unit comprising:

a passive optical network (PON) interface that receives a modified scrambled PON frame, the modified scrambled PON frame including a correction pattern in place of either a payload portion of a corresponding PON frame or a remainder of the corresponding PON frame, wherein the remainder of the corresponding PON frame begins at a bit that immediately follows a consecutive identical digit (CID) sequence and ends at a final bit of the payload portion of the corresponding PON frame;

a PON media access controller (MAC) that:

determines that a payload of the modified scrambled PON frame includes the correction pattern, at least in part by reading a correction flag of a header of the modified scrambled PON frame, wherein the correction flag indicates that the payload includes the correction pattern, and based at least in part on reading the correction flag of the header of the modified scrambled PON frame, replaces the determined correction pattern with a CID sequence at either the payload of the modified scrambled PON frame or a remainder of the modified scrambled PON frame, to form a scrambled payload;

a descrambler of the PON MAC that applies an inverse scrambling function to the scrambled payload to form a descrambled payload; and a network interface that transmits a data packet associated with the descrambled payload.

21. The optical network device of claim 20, wherein the PON MAC replaces the determined correction pattern at least in part by reading an error-type indicator of a header of the modified scrambled PON frame, wherein the error-type indicator indicates a digit of the CID sequence, and forming the CID sequence based at least in part on the indicated digit.

22. The optical network device of claim 21, wherein the PON MAC further reads an error-length indicator of the header of the modified scrambled PON frame, wherein the error-length indicator indicates a length of the CID sequence.

23. A non-transitory computer-readable medium comprising instructions for causing a hardware control unit to:

receive a modified scrambled passive optical network (PON) frame, the modified scrambled PON frame including a correction pattern in place of either a payload portion of a corresponding PON frame or a remainder of the corresponding PON frame, wherein the remainder of the corresponding PON frame begins at a bit that immediately follows a consecutive identical digit (CID) sequence and ends at a final bit of the payload portion of the corresponding PON frame;

determine that a payload of the modified scrambled PON frame includes the correction pattern, at least in part by reading a correction flag of a header of the modified scrambled PON frame, wherein the correction flag indicates that the payload includes the correction pattern;

based at least in part on reading the correction flag of the header of the modified scrambled PON frame, replace the determined correction pattern with a CID sequence at either the payload of the modified scrambled PON frame or a remainder of the modified scrambled PON frame, to form a scrambled payload;

apply an inverse scrambling polynomial to the scrambled payload to form a descrambled payload; and transmit a data packet that includes the descrambled payload.

24. A network system comprising:

a public network;

one or more optical network units (ONUs);

an optical line terminal (OLT), wherein the OLT comprises:

a hardware control unit comprising:

a framer that encapsulates at least a portion of a data packet to form a passive optical network (PON) frame;

a scrambler that applies a scrambling polynomial to at least a portion of the PON frame to generate a scrambled PON frame;

a consecutive identical digit (CID) checker that:

determines that the scrambled PON frame comprises a CID sequence greater than a threshold length, based on the determination that the scrambled PON frame comprises the CID sequence greater than the threshold length, replaces either an entirety of a payload portion of the PON frame with a correction pattern or a remainder of the PON frame with the correction pattern to generate a modified scrambled PON frame, wherein the remainder of the PON frame begins at a bit that immediately follows the determined CID sequence and ends at a final bit of the payload portion, and based on the replacement with the correction pattern, modifies a header of the modified scrambled PON frame to include a correction flag that indicates the replacement with the correction pattern; and a network interface that transmits the modified scrambled PON frame to each of the one or more ONUs using the public network.

25. The network system of claim 24, wherein the public network conforms to a gigabit-capable passive optical network (GPON) standard.

26. The network system of claim 24, wherein each ONU of the one or more ONUs comprises:

a hardware control unit comprising:

a framer that encapsulates at least a portion of a data packet to form a PON frame;

a scrambler that applies a scrambling polynomial to at least a portion of the PON frame to generate a scrambled PON frame;

a consecutive identical digit (CID) checker that determines that the scrambled PON frame comprises a CID sequence greater than a threshold length at least in part by reading the correction flag of the header of the modified scrambled PON frame, and replaces the determined CID sequence with a correction pattern to generate a modified scrambled PON frame; and a network interface that transmits the modified scrambled PON frame to the OLT using the public network.

27. The network system of claim 24, wherein at least one ONU of the one or more ONUs comprises:

a passive optical network (PON) interface that receives a modified scrambled PON frame;

a PON media access controller (MAC) that determines that a payload of the modified scrambled PON frame includes correction pattern, at least in part by reading a correction flag of a header of the modified scrambled PON frame, wherein the correction flag indicates that the payload includes the correction pattern, and replaces the determined correction pattern with CID sequence at either the payload of the modified scrambled PON frame or the remainder of the modified scrambled PON frame, to form a scrambled payload;

a descrambler of the PON MAC that applies an inverse scrambling function to the payload to form a descrambled payload; and a network interface that transmits a data packet associated with the descrambled payload.

28. The network system of claim 27, wherein each ONU of the one or more ONUs comprises:

a passive optical network (PON) interface that receives a modified scrambled PON frame;

a PON media access controller (MAC) that determines that a payload of the modified scrambled PON frame includes a correction pattern and replaces the determined correction pattern with the CID sequence;

a descrambler of the PON MAC that applies an inverse scrambling function to the payload to form a descrambled payload; and a network interface that transmits a data packet associated with the descrambled payload.

* * * * *